(12) United States Patent
Ide

(10) Patent No.: US 8,319,489 B2
(45) Date of Patent: Nov. 27, 2012

(54) POWER TRANSFER DEVICE, POWER SUPPLY DEVICE AND POWER RECEIVING DEVICE

(75) Inventor: Naoki Ide, Tokyo (JP)

(73) Assignee: Sony Corporation, Tokyo (JP)

( * ) Notice: Subject to any disclaimer, the term of this patent is extended or adjusted under 35 U.S.C. 154(b) by 824 days.

(21) Appl. No.: 12/492,662

(22) Filed: Jun. 26, 2009

(65) Prior Publication Data

US 2009/0322307 A1 Dec. 31, 2009

(30) Foreign Application Priority Data

Jun. 27, 2008 (JP) ................. P2008-168847

(51) Int. Cl.
*H01F 17/00* (2006.01)
(52) U.S. Cl. ..................................... 323/355
(58) Field of Classification Search ............... 323/355; 307/104, 105
See application file for complete search history.

(56) References Cited

U.S. PATENT DOCUMENTS

| | | | | |
|---|---|---|---|---|
| 5,619,080 | A * | 4/1997 | Pennington et al. | 307/105 |
| 7,919,886 | B2 * | 4/2011 | Tanaka | 307/104 |
| 8,174,234 | B2 * | 5/2012 | Julstrom et al. | 320/108 |
| 2009/0058190 | A1 * | 3/2009 | Tanaka | 307/104 |
| 2009/0079268 | A1 * | 3/2009 | Cook et al. | 307/104 |
| 2009/0224608 | A1 * | 9/2009 | Cook et al. | 307/104 |
| 2011/0095617 | A1 * | 4/2011 | Cook et al. | 307/104 |
| 2011/0175457 | A1 * | 7/2011 | Komiyama | 307/104 |
| 2011/0260548 | A1 * | 10/2011 | Urano | 307/104 |

FOREIGN PATENT DOCUMENTS

| | | |
|---|---|---|
| JP | 10-084304 | 3/1998 |
| JP | 2006-238548 | 9/2006 |
| JP | 2007-324532 | 12/2007 |
| JP | 2009-278837 | 11/2009 |
| WO | WO 2007-029438 | 3/2007 |

OTHER PUBLICATIONS

"Electromagnetism Exercises", Kyoritsu Shuppan Co. Ltd., pp. 277-278.
A. Karalis et al., "Efficient Wireless non-radiative mid-range energy transfer," Annals of Physics, vol. 323, No. 1, pp. 34-38 (2008).

* cited by examiner

*Primary Examiner* — Adolf Berhane
(74) *Attorney, Agent, or Firm* — Finnegan, Henderson, Farabow, Garrett & Dunner, L.L.P.

(57) ABSTRACT

A power transfer device includes: a transformer that couples a primary circuit and a secondary circuit and has a coupling constant of less than 1; and capacitances that are respectively provided in the primary circuit and the secondary circuit, and connected in series with coils that form the transformer. Circuit constants of the primary circuit and the secondary circuit are set so that the primary circuit and the secondary circuit resonate at the same frequency and a product of the square of the coupling constant, a Q value of the primary circuit and a Q value of the secondary circuit is 1. The primary circuit transfers power to the secondary circuit by means of the transformer, using a carrier wave having the resonance frequency.

13 Claims, 18 Drawing Sheets

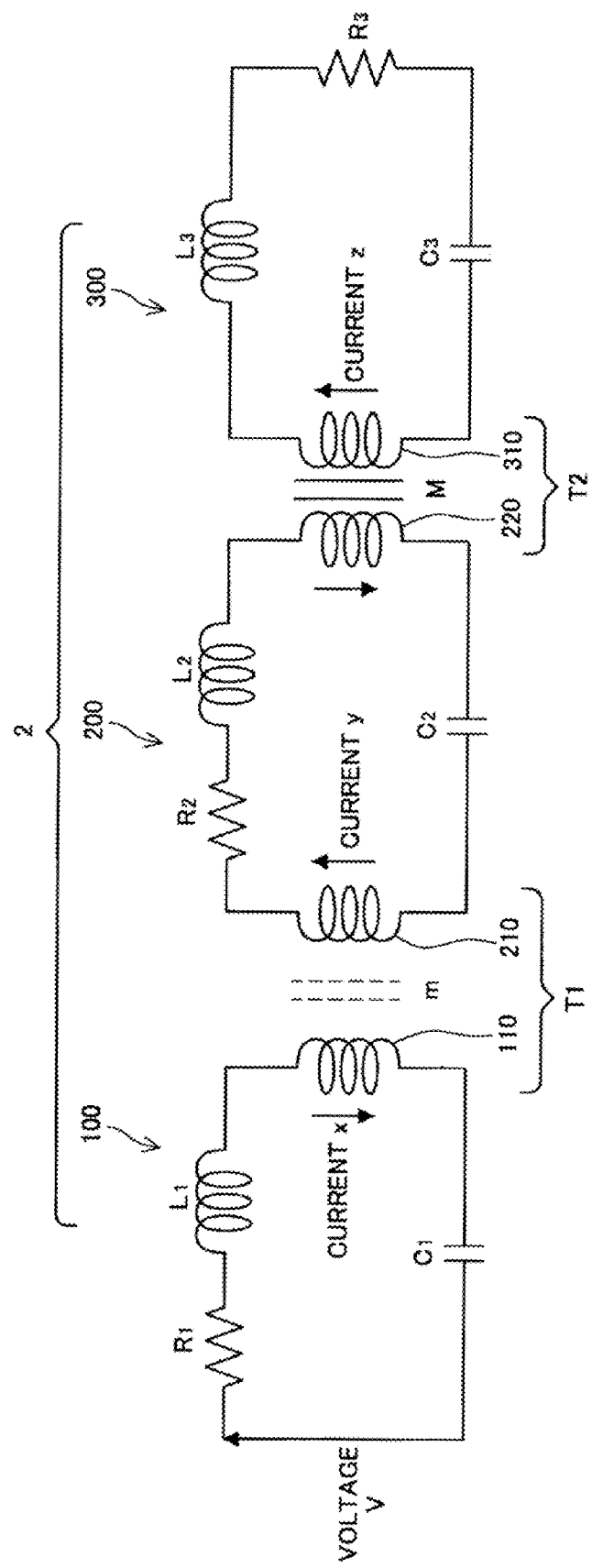

POWER TRANSFER DEVICE, POWER SUPPLY DEVICE AND POWER RECEIVING DEVICE

BACKGROUND OF THE INVENTION

1. Field of the Invention

The present invention relates to a power transfer device, a power supply device and a power receiving device.

2. Description of the Related Art

Recently, various electronic devices have been developed and mobile devices are also widely used. The mobile devices and some stationary devices incorporate batteries as a power source, and the batteries need to be charged by periodically receiving power supplied from the outside. The power supply method used can be roughly classified into, for example, a wired system and a wireless system. In the wired system, for example, a power supply terminal is electrically and directly connected to a terminal of a device to be charged, and power is supplied via this contact point. On the other hand, in the wireless system, for example, a transformer is used, and the device to be charged is electromagnetically coupled to a power supply device in a non-contact manner. Thus, power is supplied using an electric field or a magnetic field. There are many advantages to supplying power using the wireless system, for example, omitting the need to connect device terminals, and thus it Is being used in various devices.

When power is supplied by the wireless system, energy transfer efficiency of the transformer is important. For example, it is well known that the energy transfer efficiency of a transformer that has a coupling constant of 1 and that is coupled by em iron core hewing no magnetic flux leakage can foe made to be 1. The energy transfer efficiency of the transformer can be confirmed by a mathematical expression (refer to Japanese Patent Application Publication No. 2006-1238548, Electromagnetism Exercises p. 277 and p. 278, Kyoritsu Shuppan, and Annals of Physics, vol. 323, no. 1, pp. 34-38, Januray 2008, "Efficient Wireless non-radiative mid-range energy transfer"),

SUMMARY OF THE INVENTION

However, a transformer having a coupling constant of 1 is not suitable for non-contact power transfer because it is coupled by its magnetic material core forming a closed magnetic circuit. On the other hand, with a transformer that does not use such a closed magnetic circuit core of the magnetic material, it is difficult to make the coupling constant equal to 1. As a result, the energy transfer efficiency of the transformer also decreases. Therefore, a power transfer device is desired that can improve power transfer efficiency even when power is transferred with a coupling constant of less than 1, such as when power is transferred through a transformer that uses a core that is not coupled in a closed magnetic circuit or through a transformer that does not use a magnetic material core.

The present invention addresses the problems described above and provides a power transfer device, a power supply device, and a power receiving device that are new and improved and that are capable of Improving transfer efficiency when power is transferred with a coupling constant of less than 1.

According to an embodiment of the present invention, there is provided a power transfer device including: a transformer that couples a primary circuit and a secondary circuit and has a coupling constant of less than 1; and capacitances that are respectively provided in the primary circuit and the secondary circuit, and connected in series with coils that form the transformer. Circuit constants of the primary circuit and the secondary circuit are set so that the primary circuit and the secondary circuit resonate at the same frequency and a product of the square of the coupling constant, a Q value of the primary circuit and a Q value of the secondary circuit is 1. The primary circuit transfers power to the secondary circuit by means of the transformer, using a carrier wave having the resonance frequency.

According to another embodiment of the present invention, there is provided a power transfer device including: a first transformer that couples a primary circuit and a secondary circuit and has a coupling constant of less than 1; a second transformer that couples the secondary circuit and a tertiary circuit; and capacitances that, are respectively provided in the primary circuit, the secondary circuit and the tertiary circuit, and connected in series with coils that form one of the first transformer and the second transformer. Circuit constants of the primary circuit, the secondary circuit and the tertiary circuit are set so that the primary circuit, the secondary circuit and the tertiary circuit resonate at the same frequency and a product of the square of the coupling constant of the first, transformer, an inductance and a resistance of the primary circuit is equal to a product of the square of a coupling constant of the second transformer, an inductance and a resistance of the tertiary circuit. The primary circuit transfers power to the tertiary circuit via the secondary circuit by means of the first transformer and the second transformer, using a carrier wave having the resonance frequency.

Further, the primary circuit may further include an oscillator circuit including an amplifier in which an output current is positively feedbacked at the resonance frequency through a resonance circuit including the coil and the capacitance. With this configuration, because the above-described oscillator circuit is used, even if the resonance frequency has changed due to an error of a circuit constant at the design stage, a change in the coupling constant In use, or the like, it is possible to automatically oscillate at the resonance frequency. Thus, an optimal condition can be maintained.

An amplification factor of the amplifier may be equal to or more than 2.

The amplifier may be connected to the resonance circuit so that all the output current passes through the resonance circuit. With this configuration, almost all the output current flows in the coil of the oscillator circuit, unlike a normal oscillator circuit. Accordingly, power loss in the oscillator circuit can be further reduced.

The transformer may have no magnetic material core that forms a closed magnetic circuit.

The primary circuit may modulate the carrier wave in order to transfer information together with power.

The tertiary circuit may further include a full-wave rectification circuit that full-wave rectifies power obtained by the second transformer. The capacitance of the tertiary circuit may be arranged between the coil that forms the second transformer and the full-wave rectification circuit. With this configuration, because of the way that the; capacitance is arranged and because full-wave rectification circuit is used, the tertiary circuit forms a resonance circuit when viewed from the second transformer. Thus, an optimal condition can be achieved. When viewed from the load side, on the other hand, a full-wave rectification function is realized, and it is also possible to extract a direct current component effectively.

Moreover, the full-wave rectification circuit may be formed by a plurality of active elements.

According to another embodiment of the present invention, there is provided a power supply device including a primary circuit. The primary circuit includes; a coil that forms a transformer having a coupling constant of less than 1 with a coil of a power receiving device to be coupled with, the power receiving device having a secondary circuit that includes the coil and a capacitance connected in series; and a capacitance that is connected in series with the coil of the primary circuit. A circuit constant of the primary circuit is set so that the primary circuit and the secondary circuit resonate at the same frequency and a product of the square of the coupling constant, a Q value of the primary circuit and a Q value of the secondary circuit is 1. The primary circuit transfers power to the secondary circuit by means of the transformer, using a carrier wave having the resonance frequency.

According to another embodiment of the present invention, there is provided a power receiving device including a secondary circuit. The secondary circuit includes: a coil that forms a transformer having a coupling constant of less than 1 with a coil of a power supply device to be coupled with, the power supply device having a primary circuit that includes the coil and a capacitance connected in series; and a capacitance that is connected in series with the coil of the secondary circuit. A circuit constant of the secondary circuit is set so that the primary circuit and the secondary circuit resonate at the same frequency and a product of the square of the coupling constant, a Q value of the primary circuit and a Q value of the secondary circuit is 1. The secondary circuit receives power that is transferred from the primary circuit by means of the transformer using a carrier wave having the resonance frequency.

According to another embodiment of the present invention, there is provided a power supply device including a primary circuit. The primary circuit includes: a coil that forms a first transformer having a coupling constant of less than 1 with a coil of a secondary circuit of a power receiving device to be coupled with, the power receiving device having a secondary circuit and a tertiary circuit that each include a coil and a capacitance connected in series and that are coupled, via a second transformer; and a capacitance that is connected in series with the coil of the primary circuit. A circuit constant of the primary circuit Is set so that the primary circuit, the secondary circuit and the tertiary circuit resonate at the same frequency and a product of the square of the coupling constant of the first transformer, an inductance and a resistance of the primary circuit is equal to a product of the square of the coupling constant of the second transformer, an inductance and a resistance of the tertiary circuit. The primary circuit transfers power to the tertiary circuit via the secondary circuit by means of the first transformer and the second transformer, using a carrier wave having the resonance frequency.

According to another embodiment of the present invention, there is provided a power receiving device that includes a secondary circuit and a tertiary circuit. The secondary circuit includes: a first coil that forms a first, transformer having a coupling constant of less than 1 with a coil of a power supply device to be coupled with, the power supply device having a primary circuit that includes the coil and a capacitance; connected in series; and a capacitance that is connected in series with the first coil. The tertiary circuit includes: a third coil that forms a second transformer with a second coil of the secondary circuit, to be coupled with, the second coil being connected in series with the first coil; and a capacitance that is connected in series with the third coil. Circuit constants of the secondary circuit and the tertiary circuit are set so that the primary circuit, the secondary circuit and the tertiary circuit resonate at the same frequency and a product of the square of the coupling constant of the first transformer, an inductance and a resistance of the primary circuit is equal to a product of the square of a coupling constant of the second transformer, an inductance and a resistance of the tertiary circuit. The tertiary circuit receives power that is transferred from the primary circuit via the secondary circuit by means of the second transformer using a carrier wave having the resonance frequency.

According to the embodiments of the present invention described above, the transfer efficiency can be improved when power is transferred with a coupling constant of less than 1.

BRIEF DESCRIPTION OF THE DRAWINGS

FIG. 1B is an explanatory diagram illustrating non-contact power transfer using another power transfer device according to each embodiment of the present invention;

DETAILED DESCRIPTION OF THE PREFERRED EMBODIMENTS

Figure 1A:
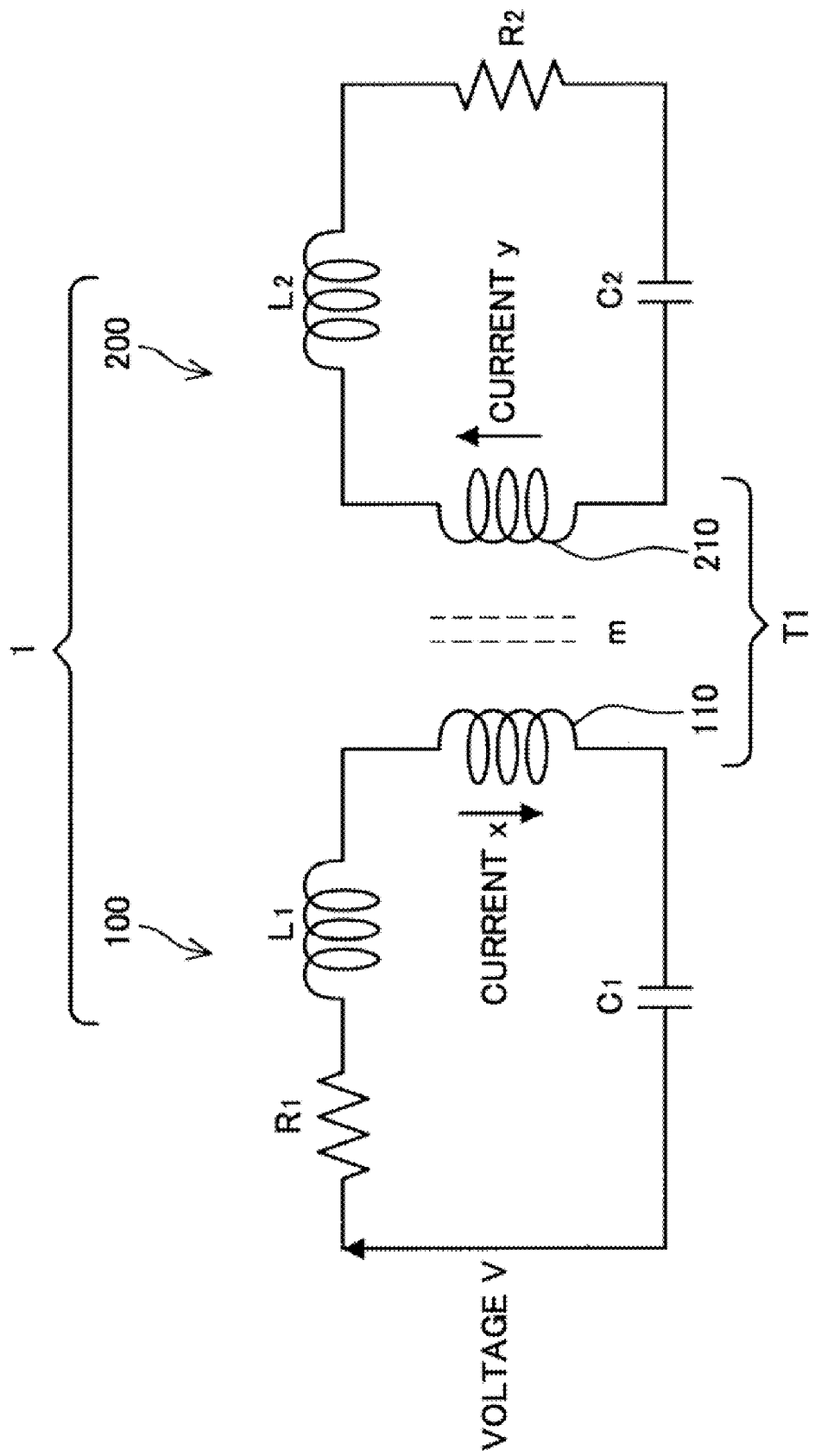
FIG. 1A is an explanatory diagram illustrating non-contact power transfer using a power transfer device according to each embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Power Transfer Device According to Related Art

Figure 14:
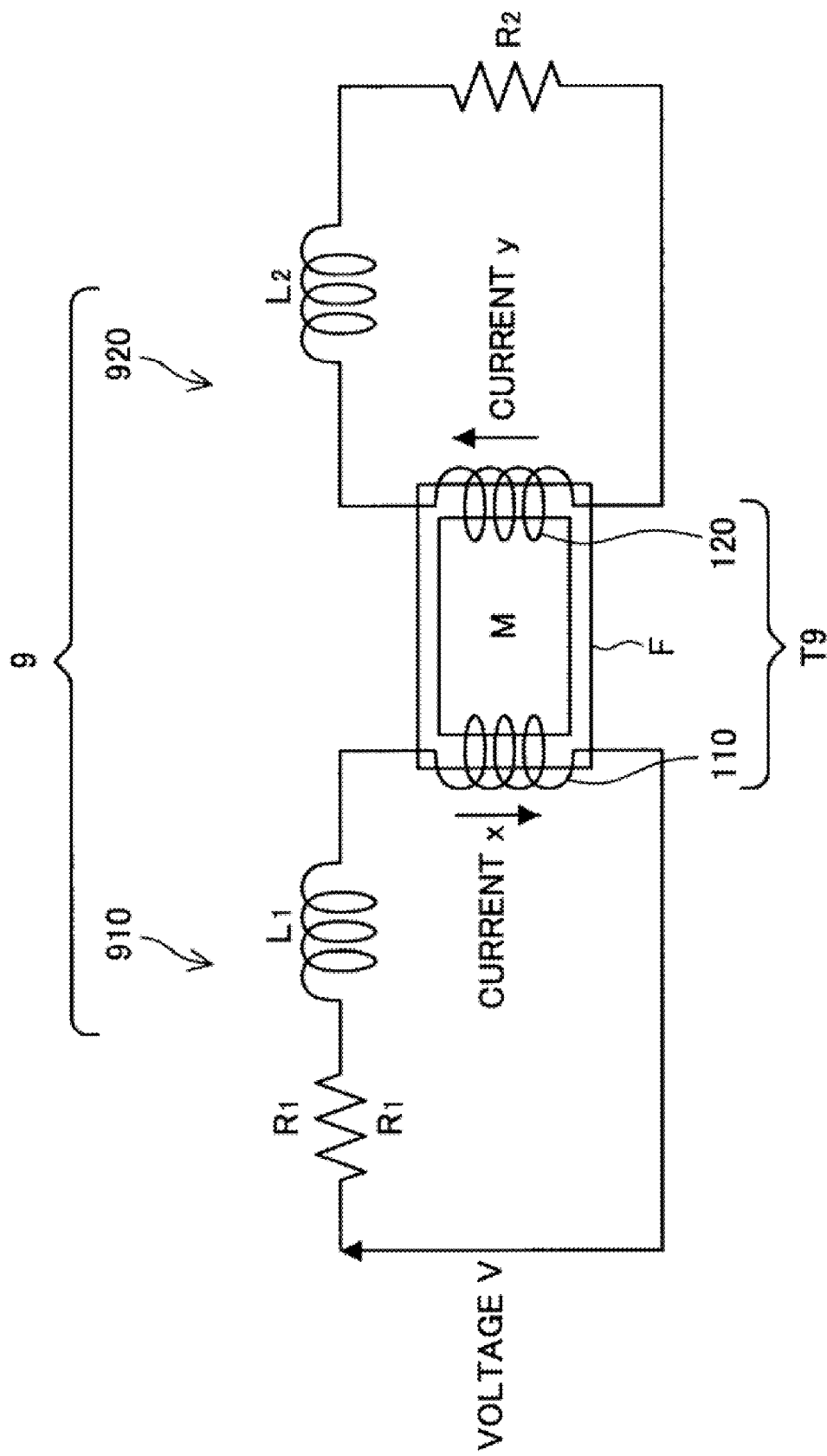
FIG. 14 is an explanatory diagram illustrating power transfer through a transformer according to a related art.

First, before explaining a power transfer device according to each embodiment of the present invention, a power transfer device according to a related art, which uses a transformer that has a coupling constant of 1 and that, is coupled by an iron core having no magnetic flux leakage, will be described with reference to FIG. 14. FIG. 14 is an explanatory diagram illustrating power transfer through the transformer according to the related art.

FIG. 14 schematically shows a manner in which energy is transferred through a transformer T9 in a power transfer device 9 according to the related art.

A closed circuit on the left side that includes a resistance $R_1$ and an inductance $L_1$ is a primary circuit 910 of the transformer T9. The primary circuit 910 is formed to supply an alternate voltage V. The resistance $R_1$ is the sum of a resistance component of the circuit and an output resistance component of a voltage supply source. The inductance $L_1$ is the sum of an inductance component of the circuit and an inductance of a primary side coil 110 of the transformer T9, and is schematically illustrated.

A closed circuit on the right side that includes a resistance $R_2$ and an Inductance $L_2$ is a secondary circuit 920 of the transformer T9. The secondary circuit 920 is formed to supply current to a load. The resistance $R_2$ is the sum of a resistance component of the circuit and an input resistance applied to the load. In a similar manner to the primary circuit 910, the inductance $L_2$ is the sum of em inductance of the circuit and an inductance of a secondary side coil 210 of the transformer T9, and is schematically illustrated.

Further, a mutual inductance M is realized by means of the transformer T9 that couples the primary circuit 910 and the secondary circuit 920. Here, it is assumed that the transformer T9 includes a magnetic material core F so that there is no magnetic flux leakage and the coupling constant is 1.

In this case, the Ohm's law in the primary circuit 910 and the secondary circuit 920 is expressed as the simultaneous equations of Expression 1-1. As a result, the value of the current flowing in the secondary circuit 920 is expressed by Expression 1-2. Here, it is assumed that the resistance $R_1$ of the primary circuit 910 is a signal source impedance and the resistance $R_2$ of the secondary circuit 920 is a load impedance. In this case, an S parameter from the signal source impedance to the load impedance is expressed by Expression 1-3.

$$V = (R_1 + j\omega L_1)x + j\omega My \quad \text{Expression 1-1}$$
$$0 = j\omega Mx + (R_2 + j\omega L_2)y$$

-continued $$y = \frac{-jM\omega}{(R_1 + j\omega L_1)(R_2 + j\omega L_2) + (M\omega)^2} V \quad \text{Expression 1-2}$$

$$S_{21} = \frac{\sqrt{R_2}\, y}{V/(2\sqrt{R_1})} = \frac{-2j\sqrt{R_1 R_2}\, M\omega}{(R_1 + j\omega L_1)(R_2 + j\omega L_2) + (M\omega)^2} \quad \text{Expression 1-3}$$

The energy transfer efficiency of the transformer T9 according to the related art is expressed by the square of the absolute value of Expression 1-3. The energy transfer efficiency of Expression 1-3 is not 1. However, if the coupling constant is 1, the energy transfer efficiency can be made to be approximately 1 by supplying an AC voltage at a relatively high frequency, for example, by satisfying the equation $R_1 L_2 = L_1 R_2$.

Note that examples that satisfy the equation $R_1 L_2 = L_1 R_2$ include $R_1 = R_2 = R$, $L_1 = L_2 = L$. Further, the energy transfer efficiency used herein is a ratio of the power applied to the load and the maximum power that the signal source can supply to the load. In addition, if the coupling constant is 1, it means that the power transfer efficiency is equal to that achieved in contact power transfer. When the coupling constant k is 1, the mutual inductance M satisfies the equation $M=kL=L$. In this case, Expression 1-3 can be transformed to Expression 1-4, Therefore, when the condition of Expression 1-5 is satisfied, the energy transfer efficiency can be made to be 1.

$$|S_{21}| = \left|\frac{-2jRL\omega}{(R+j\omega L)^2 + (L\omega)^2}\right| = \left|\frac{2\omega L}{R+j2\omega L}\right| \xrightarrow{R \ll \omega L} 1 \quad \text{Expression 1-4}$$

$$R \ll \omega L \quad \text{Expression 1-5}$$

If the transformer T9 has a coupling constant of 1 where there is no magnetic flux leakage, the power transfer efficiency can be made to be 1 by increasing the frequency of the supplied AC voltage to a certain level.

However, in the above-described transformer T9, the magnetic material core F must be coupled by forming a closed magnetic circuit. Therefore, the transformer T9 is not suitable for non-contact power transfer.

Given this, it is conceivable that either a core that is not coupled in a closed magnetic circuit, or an air-core transformer made by removing the magnetic material core F could be used for non-contact power transfer.

However, if is physically very difficult to achieve a coupling constant of 1 of a transformer with the above-described structure. When the coupling constant is less than 1, even if a high frequency AC voltage is supplied, the transfer efficiency decreases in proportion to the coupling constant k. Therefore, it is difficult to achieve a transfer efficiency of 1.

To address this, as a method to achieve a high efficiency even if the coupling constant decreases, a method has been proposed that uses the same resonance frequency in the primary circuit 910 and the secondary circuit 920 of the transformer.

Although the above-described method improves the decrease in the transfer efficiency due to the decrease in the coupling constant, it is difficult to achieve transfer efficiency of 1 and realize high efficiency as achieved in the contact power transfer.

The inventor of the present invention has conducted painstaking research on power transfer devices. As a result, the inventor of the present invention has identified ways of improving the above-described power transfer device according to the related art, and has devised the present invention that can improve transfer efficiency when power is transferred with a coupling constant of less than 1. Hereinafter, a power transfer device according to each embodiment of the present invention will be described.

Overview of Each Embodiment of the Present Invention

First, before individually describing each embodiment of the present invention, an overview of each embodiment of the present invention will be given with reference to FIG. 1A and FIG. 1B. FIG. 1A is a diagram schematically illustrating equivalent circuits of a power transfer device according to each embodiment of the present invention.

Power Transfer Device 1

As shown in FIG. 1A, a power transfer device 1 according to each embodiment of the present invention includes a primary circuit (also referred to as a power supply device) 100 on the power supply side, a secondary circuit (also referred to as a power receiving device) 200 on the power receiving side, and a transformer T1 that is formed of the primary circuit 100 and the secondary circuit 200 and supplies power in a non-contact manner.

As shown in FIG. 1A, in the primary circuit 100 of the transformer T1, a resistance $R_1$, a primary side coil 110 (an inductance $L_1$) of the transformer T1, and a capacitance $C_1$ are connected in series with a circuit (not shown in the figures) of a voltage supply source. Similar to the example in which the transfer efficiency of the transformer according to the related art was analyzed, the resistance $R_1$ is the sum of a resistance component of the circuit and an output resistance component of the voltage supply source. Further, it is assumed that the inductance $L_1$ represents the sum of em inductance component of the circuit and an inductance of the transformer T1.

Further, in the secondary circuit 200 of the transformer T1, a resistance $R_2$, a secondary side coil 210 (an inductance $L_2$) of the transformer T1, and a capacitance $C_2$ are connected in series with a load circuit (not shown in the figures) that receives electric power. Similar to the case where the transformer according to the related art was explained, the resistance $R_2$ is the sum of a resistance component of the circuit and an input resistance component of the load. Further, in a similar manner to the primary circuit 100, it is assumed that the inductance $L_2$ represents the sum of an inductance of the circuit and an inductance of the transformer T1.

In FIG. 1A, the transformer T1 that couples the primary circuit 100 with the secondary circuit 200 is used to obtain a mutual inductance m. However, the coupling constant may be a value other than 1, and an air core transformer that does not include a magnetic material core may be used. Further, the mutual inductance m may be obtained by a simple structure, for example, coils on the primary circuit 100 and the secondary circuit 200 or loop antennas arranged at two locations.

In this case, the Ohm's law in the primary circuit 100 and the secondary circuit 200 is expressed as the simultaneous equations of Expression 2-1. As a result, an S parameter from a signal source impedance of the primary circuit 100 to a load impedance of the secondary circuit 200 is expressed by Expression 2-2. Accordingly, the energy transfer efficiency of the transformer T1 becomes equal to the square of the absolute value of Expression 2-2. In order for the energy transfer efficiency of Expression 2-2 to be 1, the following conditions are sequentially applied to the power transfer device 1 according to each embodiment of the present invention.

$$V = \left(R_1 + j\omega L_1 + \frac{1}{j\omega C_1}\right)x + j\omega My \quad \text{Expression 2-1}$$

$$0 = j\omega Mx + \left(R_2 + j\omega L_2 + \frac{1}{j\omega C_2}\right)y \quad \text{Expression 2-2}$$

$$S_{21} = \frac{-2j\sqrt{R_1 R_2}\, M\omega}{\left(R_1 + j\omega L_1 + \frac{1}{j\omega C_1}\right)\left(R_2 + j\omega L_2 + \frac{1}{j\omega C_2}\right) + (M\omega)^2}$$

First, <Condition 1: the primary circuit 100 and the secondary circuit 200 resonate at the same frequency> is applied.

In order to simply match the resonance frequencies of the primary circuit 100 and the secondary circuit 200, it is assumed that the following equations are satisfied: $L_1=L_2=L$, $C_1=C_2=C$. In this case, the resonance frequency $\omega_{res}$ of the primary circuit 100 and the secondary circuit 200 is expressed by Expression 2-3.

$$\omega_{res} = \frac{1}{\sqrt{LC}} \quad \text{Expression 2-3}$$

The energy transfer efficiency at this resonance frequency is expressed by the square of Expression 2-4.

When focusing on the relationship between the two denominator terms and the numerator term in Expression 2-4, it is found that the value of Expression 2-4 is equal to or less than 1 from the relationship of the arithmetic-geometric mean inequality. Then, only when the two denominator terms are the same, i.e., only when the relationship of Expression 2-5 is satisfied, the square of Expression 2-4, i.e., the energy transfer efficiency is 1.

$$|S_{21}| = \frac{2\sqrt{R_1 R_2}\, M\omega_{res}}{R_1 R_2 + (M\omega_{res})^2} \quad \text{Expression 2-4}$$

$$R_1 R_2 = (M\omega_{res})^2 \quad \text{Expression 2-5}$$

When the relationship of Expression 2-5 is transformed, Expression 2-6 is obtained.

More specifically, it is found that the energy transfer efficiency at the resonance frequency is 1 when the following condition is satisfied <Condition 2: the product of the square of the coupling constant, the Q value of the primary circuit 100 and the Q value of the secondary circuit 200 is 1>. Note that the Q value formula of the series resonant circuit expressed by Expression 2-7 is used to obtain the Q values.

$$1 = \frac{(M\omega_{res})^2}{R_1 R_2} = \frac{M^2}{R_1 R_2 \sqrt{L_1 L_2 C_1 C_2}} = \quad \text{Expression 2-6}$$

$$k^2\left(\frac{1}{R_1}\sqrt{\frac{L_1}{C_1}}\right)\left(\frac{1}{R_2}\sqrt{\frac{L_2}{C_2}}\right) = k^2 Q_1 Q_2$$

$$Q = \frac{1}{R}\sqrt{\frac{L}{C}} \quad \text{Expression 2-7}$$

As described above, in the power transfer device 1, it is found that the energy transfer efficiency can be made to be 1 regardless of whether the coupling constant is 1, if the following conditions are satisfied:

Condition 1: the primary circuit 100 and the secondary circuit 200 are formed as a series resonant circuit having the same resonance frequency; and Condition 2; the product of the square of the coupling constant and the product of the Q values of the primary circuit 100 and the secondary circuit 200 is made to be 1.

Note that, if Condition 2 is modified in terms of the coupling constant, Expression 2 is obtained.

$$k = \frac{1}{\sqrt{Q_1 Q_2}} \quad \text{Expression 2}$$

In this manner, even when the coupling constant is not 1, if circuit constants are determined to satisfy Expression 2-6 (or Expression 2), the energy transfer efficiency can be made to be 1 by transferring power using a carrier wave having the resonance frequency. Therefore, even when power is transferred in a non-contact manner without using a physical medium, such as a wire or the magnetic material core of the transformer, energy can be transferred with the same efficiency as achieved in the contact power transfer.

In the above-described power transfer device 1 according to each embodiment of the present invention, the secondary circuit 200 that receives power does not include a transformer other than the transformer T1 for power transfer. On the other hand, if the secondary circuit 200 that receives power further uses another transformer to supply power to a tertiary circuit, a power transfer device 2 described below can be used in each embodiment of the present invention.

Power Transfer Device 2

FIG. 1B is a diagram schematically illustrating equivalent circuits of a power transfer device according to each embodiment of the present invention.

Similar to the above-described power transfer device 1, as shown in FIG. 1B, the power transfer device 2 includes the primary circuit 100 on the power supply side, the secondary circuit 200 on the power receiving side, and the transformer T1 that is formed by the primary circuit 100 and the secondary circuit 200 and supplies power in a non-contact manner. Further, the power transfer device 2 includes a tertiary circuit 300 that receives power from the secondary circuit 200, and a transformer T2 that is formed by the secondary circuit 200 and the tertiary circuit 300 and supplies power in a non-contact manner. Note that the transformer T1 is an example of a first transformer, and the transformer T2 is an example of a second transformer.

In the primary circuit 100 shown in FIG. 1B, the resistance $R_1$ is the sum of a resistance component of the circuit and an output resistance component of a voltage supply source. Further, the Inductance $L_1$ represents the sum of an inductance component of the circuit and an inductance of the transformer T1. The capacitance $C_1$ causes LC resonance.

In the secondary circuit 200, the resistance $R_2$ is a resistance component of the circuit, and the inductance $L_2$ represents the sum of an inductance component of the circuit and inductances of the two transformers T1 and T2. The capacitance $C_2$ causes LC resonance.

The mutual inductance m is a mutual inductance that couples the primary circuit 100 and the secondary circuit 200 using the transformer T1 of a non-closed magnetic circuit. The coupling constant k is determined by the positional relationship of the coils, and need not be 1 in a similar manner to the above-described power transfer device 1.

Further, in the tertiary circuit 300, the resistance $R_3$ is the sum of a resistance component, and an input resistance component of the load, and the inductance $L_2$ is the sum of an inductance of the circuit and an inductance of the transformer T2. The capacitance $C_3$ causes LC resonance.

A mutual inductance M is a mutual inductance that is obtained when the secondary circuit 200 and the tertiary circuit 300 are coupled by the transformer T2 formed by a secondary side coil 220 and a tertiary side coil 320. A value close to 1 is desirable for the coupling constant.

Impedances of the primary circuit 100, the secondary circuit 200 and the tertiary circuit 300 are respectively referred to as $Z_1$, $Z_2$ and $Z_3$. These impedances are series impedances of the respective circuits having circuit constants. In this case the Ohm's law in the primary circuit 100, the secondary circuit 200 and the tertiary circuit 300 is expressed as the simultaneous equations of Expression 3-1. As a result, an S parameter from a signal source Impedance of the primary circuit 100 to a load impedance of the secondary circuit 200 is expressed by Expression 3-2. Accordingly, the energy transfer efficiency of this transformer becomes equal to the square of the absolute value of Expression 3-2, In order for the energy transfer efficiency of Expression 3-2 to be 1, the following conditions are sequentially applied to the power transfer device 2 according to each embodiment of the present invention.

$$\begin{pmatrix} V \\ 0 \\ 0 \end{pmatrix} = \begin{pmatrix} Z_1 & j\omega m & 0 \\ j\omega m & Z_2 & j\omega M \\ 0 & j\omega M & Z_3 \end{pmatrix} \begin{pmatrix} x \\ y \\ z \end{pmatrix} \quad \text{Expression 3-1}$$

$$S_{21} = \frac{-2\sqrt{R_1 R_2} \, M m \omega^2}{Z_1 Z_2 Z_3 + (M^2 Z_1 + m^2 Z_3)\omega^2} \quad \text{Expression 3-2}$$

First, <Condition 3; the primary circuit 100, the secondary circuit 200 and the tertiary circuit 300 resonate at the same frequency> is applied.

In order to simply match the resonance frequencies of the primary circuit 100 to the tertiary circuit 300, it is assumed that the following equations are satisfied: $L_1 = L_2/2 = L_3 = L$, $C_1 = 2C_2 = C_3 = C$. In this case, the resonance frequency $\omega_{res}$ of the primary circuit 100, the secondary circuit 200 and the tertiary circuit 300 is expressed by Expression 3-3.

$$\omega_{res} = \frac{1}{\sqrt{LC}} \quad \text{Expression 3-3}$$

The energy transfer efficiency at this resonance frequency is expressed by the square of Expression 3-4.

Now let us focus on the relationship between the two denominator terms and the numerator term in Expression 3-4. The first denominator term can be made small enough to be ignored if the resistance $R_2$ of the secondary circuit 200 is reduced. Therefore, if the resistance $R_2$ of the secondary circuit 200 is set to be small enough compared to the Q value of the primary circuit 100 and the secondary circuit 200, for example, set to be $\frac{1}{10}$ or less of the Q value, the first denominator term can be made small enough to be ignored. At this time, the numerator and the second and third denominator terms are equal to or less than 1 in Expression 3-4, based on the relationship of the arithmetic-geometric mean inequality. However, only when the second and third denominator terms are the same, i.e., only when the relationship of Expression 3-5 is satisfied, the square of Expression 3-4, i.e., the energy transfer efficiency is 1.

$$|S_{21}| = \frac{2\sqrt{R_1 R_3}\, Mm\omega_{res}^2}{R_1 R_2 R_3 + (M^2 R_1 + m^2 R_3)\omega_{res}^2} \quad \text{Expression 3-4}$$

$$M^2 R_1 = m^2 R_3 \quad \text{Expression 3-5}$$

When the relationship of Expression 3-5 is transformed, Expression 3-6 is obtained.

More specifically, it is found that the energy transfer efficiency at the resonance frequency is 1 when the following condition is satisfied <Condition 4: the product of the square of the coupling constant k of the transformer T1 on the left side, the inductance $L_1$ and the resistance $R_1$ of the primary circuit 100 is equal to the product of the square of the coupling constant k' of the transformer T2 on the right side, the inductance $L_3$ and the resistance $R_3$ of the tertiary circuit 300>.

$$k_1^2 L_1 R_1 = k_3^2 L_3 R_3 \quad \text{Expression 3-6}$$

As described above, in the power transfer device 2, it is found that the energy transfer efficiency can toe made to be 1 regardless of whether the coupling constant is 1, if the following conditions are satisfied:

Condition 3: the primary circuit 100, the secondary circuit 200 and the tertiary circuit 300 are formed as a series resonant, circuit having the same resonance frequency; and Condition 4: the product, of the square of the coupling constant k of the transformer T1 on the left side, the inductance $L_1$ and the resistance $R_1$ of the primary circuit 100 is equal to the product of the square of the coupling constant k' of the transformer T2 on the right side, the inductance $L_3$ and the resistance $R_3$ of the tertiary circuit 300.

Even when the coupling constant is not 1, if the circuit, constants are determined to satisfy Expression 3-6, the energy transfer efficiency can be made to be 1. Therefore, even when power is transferred in a non-contact manner without using a physical medium, such as a wire or the magnetic material core of the transformer, energy can be transferred with the same efficiency as achieved in the contact power transfer.

This completes the description of the overview of the power transfer devices 1 and 2 according to each embodiment of the present invention. Next, specific embodiments of the present invention will be described. Note that power transfer devices according to respective embodiments, which will be described below, are structured to satisfy Condition 1 and Condition 2, or Condition 3 and Condition 4, which are explained for the above-described power transfer devices 1 and 2. The power transfer devices according to respective embodiments can improve the power transfer efficiency based on the principles explained for the above-described power transfer devices 1 and 2.

Power Transfer Device According to First Embodiment

Figure 2A:
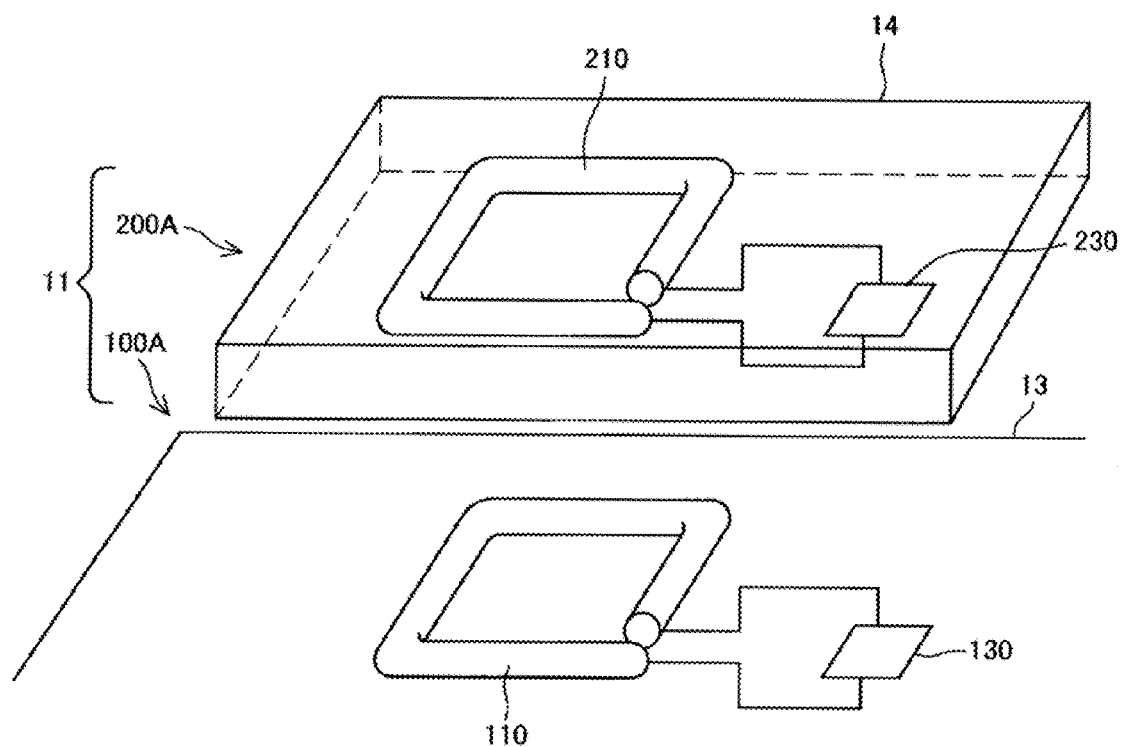
FIG. 2A is an explanatory diagram illustrating a power transfer device according to a first, embodiment of the present, invention.

FIG. 2A is an explanatory diagram illustrating a power transfer device according to a first embodiment of the present invention.

Of two devices 13 and 14 shown in FIG. 2A, the device 13 on the lower side is a stationary device (for example, a desktop personal computer (PC), a ticket gate machine, a card reader etc.), or a device similar to such stationary devices (for example, a laptop PC etc.). On the other hand, the device 14 on the upper side is a mobile device.

The devices 13 and 14 include, as a primary circuit 100A or a secondary circuit 200B, the coils (or the loop antennas) 110 and 210 according to each embodiment of the present invention, and the capacitances (not shown in the figures) $C_1$ and $C_2$. In addition, the stationary device 13 on the lower side includes, for example, an electronic circuit 130 that has a power supply circuit and an AC power supply adaptor etc. The device 14 on the upper side includes, for example, an electronic circuit 230 that has a power receiving circuit with no battery. The device 14 may further include a battery etc., if necessary. The coils, the circuit constants of the power supply circuit and the power receiving circuit, and the like are set to satisfy the above-described Condition 1 and Condition 2, or Condition 3 and Condition 4. Detailed structures of the coils, the power supply circuit and the power receiving circuit will be described later.

Efficient power supply according to each embodiment of the present, invention from the device 13 to the device 14 may be started by moving the upper device 14 closer to the lower device 13 while a power supply function of the lower device 13 is ON, or by turning ON a power receiving function of the upper device 14 located originally In the vicinity of the lower device 13.

The power supplied in the above manner may be used to enable the upper device 14 to do some type of operation, even in a situation where no battery is active such as when the main body of the upper device 14 has no power source, or even when a battery or the like is provided but the power is OFF. It is also conceivable that the supplied power is used to compensate for power when the remaining battery amount of the upper device 14 is insufficient, or used for electric charge. Moreover, the supplied power may be used to transmit some information from the lower device 13 to the upper device 14, by adding modulation such as on-off keying (OOK) to a carrier wave by the lower device 13 if necessary. Alternatively, the supplied power may be used to transmit some information from the upper device 14 to the lower device 13, by the upper device 14 performing load modulation on the carrier wave output from the lower device 13. In other words, this power transfer device can also be used as a communication device. This also applies to other embodiments described later.

The above-described function is similar to a power supply function of a card reader for an IC card according to a related art. However, as compared to the IC card according to the related art, a power transfer device 11 according to the present embodiment can improve the power transfer efficiency. Therefore, the power transfer device 11 according to the present embodiment can promote energy saving of a card reader, realization of a process that requires a lot of energy on the mobile device 14 side, auxiliary charge on the mobile device 14 side, and the like, which are not achieved by the card reader and the IC card according to the related art.

Power Transfer Device According to Second Embodiment

Figure 2B:
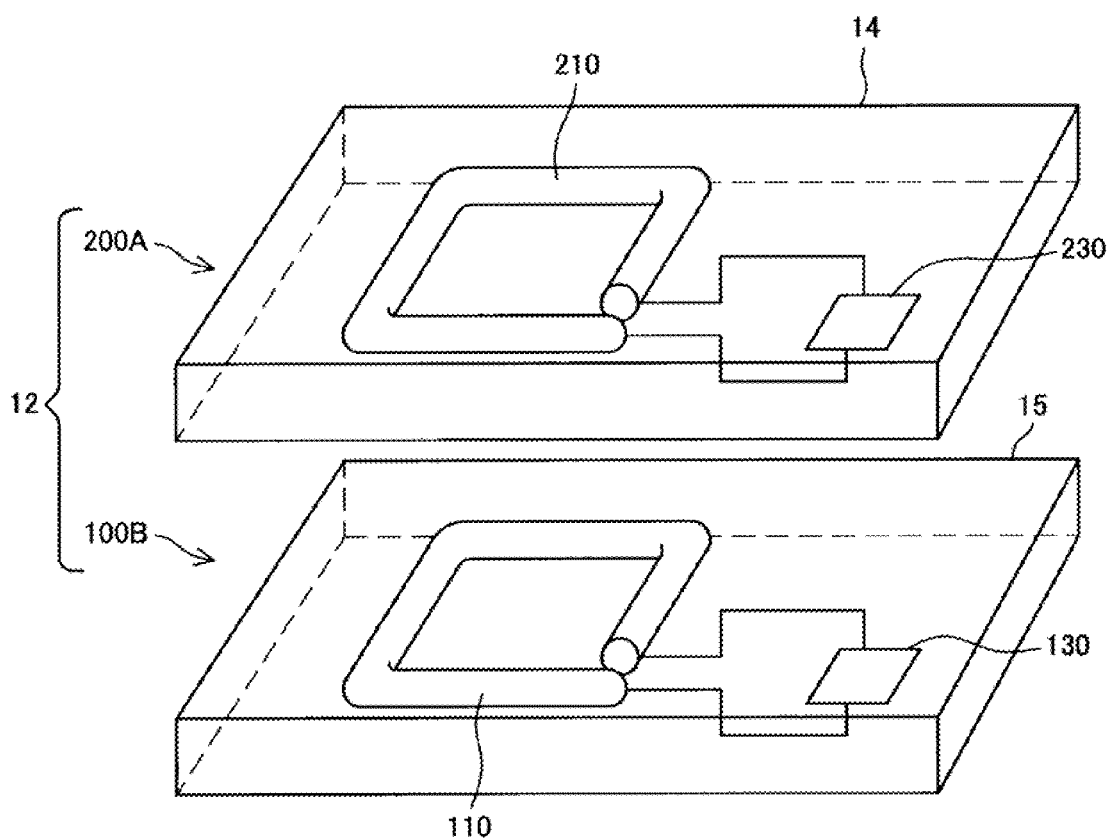
FIG. 2B is an explanatory diagram illustrating a power transfer device according to a second embodiment of the present, invention.

FIG. 2B is an explanatory diagram illustrating a power transfer device according to a second embodiment of the present invention.

Two devices 14 and 15 shown in FIG. 2B are mobile devices.

The two devices 15 and 14 respectively include, as a primary circuit 100B and a secondary circuit 200A, the coils (or the loop antennas) 110 and 210 according to each embodiment, of the present invention, and the capacitances (not shown in the figures) $C_1$ and $C_2$. In addition, the two devices 15 and 14 respectively include the electronic circuits 130 and 230 that have, for example, a power supply circuit, a power receiving circuit, and a battery. The two devices 15 and 14 are driven by a battery or the like. The coils, the circuit constants of the power supply circuit and the power receiving circuit, and the like; are set to satisfy the above-described Condition 1 and Condition 2, or Condition 3 and Condition 4. Detailed structures of the coils, the power supply circuit and the power receiving circuit will be described later.

These mobile devices 15, 14 are equivalent unlike the example of the first embodiment shown in FIG. 2A. Therefore, both devices can have a power supply function and a power receiving function. However, for convenience of explanation, it is assumed here that the device 15 on the lower side has a power supply function and the device 14 on the upper side has a power receiving function.

In this case, efficient power supply according to each embodiment of the present invention from the device 15 to the device 14 may be started by turning ON both the power receiving function of the upper device 14 and the power supply function of the lower device 15, or by moving the devices 14 and 15 closer to each other.

The power supplied in the above manner may be used to enable the upper device 14 to do some type of operation even when the power of main body of the upper device 14 is set to off. It is also conceivable that the supplied power is used when the battery of the upper device 14 is insufficient and electric charge is necessary. Alternatively, the supplied power may be used to transmit some information by adding the Information to a carrier wave.

The above-described functions work even when the power of one of the mobile devices 14 and 15 that communicate with each other is set to off. Therefore, usability is improved.

Power Supply Circuit and Power Receiving Circuit According to First Embodiment and Second Embodiment Hereinafter, the power supply circuit and the power receiving circuit including the coils 110 and 210 that are incorporated in the devices shown in FIG. 2A and FIG. 2B will be sequentially described in detail. Then, it will be shown by calculation and simulation that the power transfer device according to each embodiment of the present invention can achieve a transfer efficiency of 1.

Figure 3:
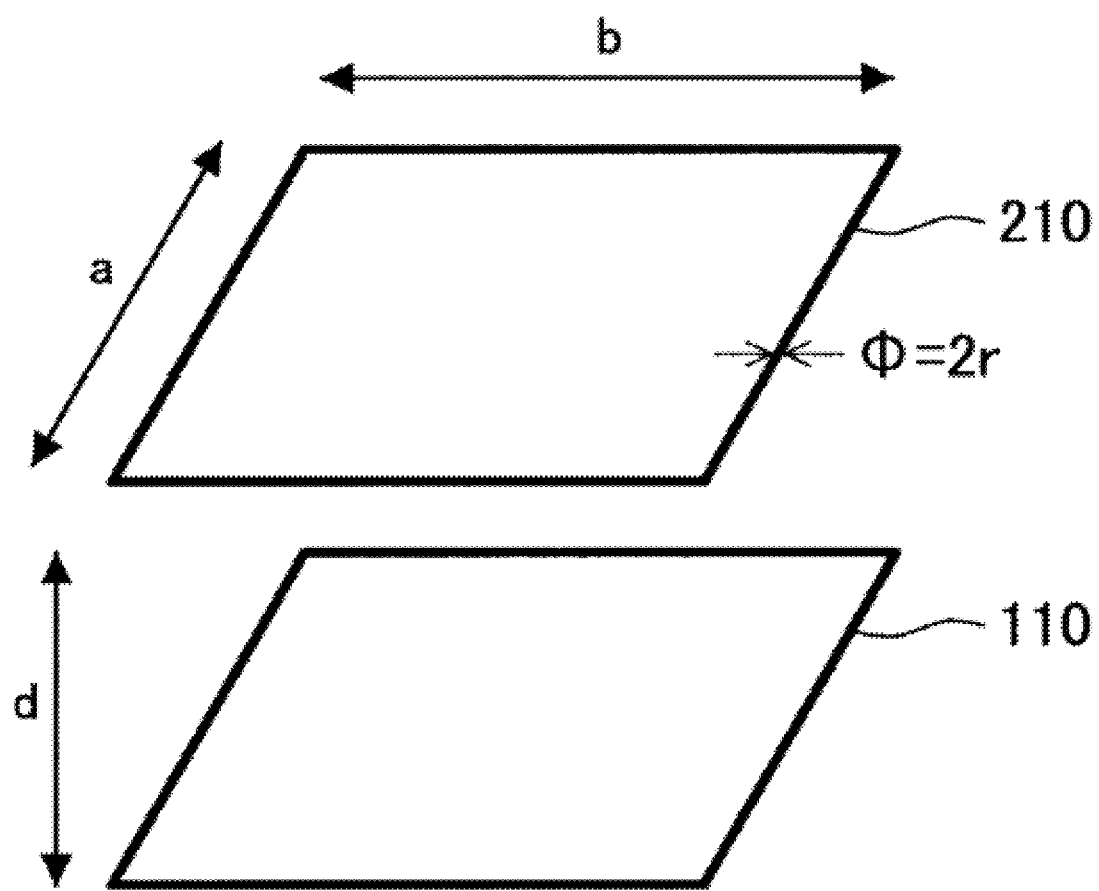
FIG. 3 is an explanatory diagram illustrating, based on a circuit theory, coils included in the power transfer device according to each embodiment of the present, invention.

FIG. 3 is a diagram schematically illustrating the coils 110 and 210 that are used in each embodiment shown in, for example, FIG. 2A and FIG. 2B.

To make calculation easier, it is assumed that the primary circuit coil 110 on the lower side has a rectangular shape with a longitudinal length of a, a vertical length of b, and a conductor of the coil has a cylindrical shape with a diameter of 2r. Note that it is assumed that r<<a, b. Further, it is assumed that the secondary circuit coil 210 on the upper side is the same as the coil 110 on the lower side, and is arranged vertically away from the coil plane of the coil 110 by a distance of d. Note that r<21 d. In this case, the two rectangular coils 110 and 210 are given as an example. However, the coils 110 and 210 may have a shape other than a rectangular shape, and they may be normal circular coils, elliptical coils, or any other coils having a variety of shapes. The reason why the rectangular shape is used here is that, when the two rectangular coils 110 and 210 are coaxially arranged so as to be opposed to each other, the mutual inductance can be analytically calculated and design can be made easier.

The mutual inductance of the two coils 110 and 210 shown in FIG. 3, and the self inductance of each of the coils 110 and 210 can be expressed by Expression 4-1 and Expression 4-2, respectively, as described in Electromagnetism Exercises p. 277 and p. 278, Kyoritsu Shuppan.

$$M = \frac{\mu_0}{\pi}\left\{ a\log\frac{(a+\sqrt{d^2+a^2})\sqrt{b^2+d^2}}{d(a+\sqrt{d^2+a^2+b^2})} + b\log\frac{(b+\sqrt{d^2+b^2})\sqrt{a^2+d^2}}{d(b+\sqrt{d^2+a^2+b^2})} - \\ 2\sqrt{d^2+a^2} - 2\sqrt{d^2+b^2} + 2\sqrt{d^2+a^2+b^2} + 2d \right\}$$ Expression 4-1

$$L = \frac{\mu_0}{\pi}\left\{ -a\log(a+\sqrt{a^2+b^2}) - b\log(b+\sqrt{a^2+b^2}) + (a+b)\log\left(\frac{2ab}{r}\right) + \\ \sqrt{a^2+b^2} - 2(a+b) \right\}$$ Expression 4-2

Note that the number of turns of each of the coils 110 and 210 shown in FIG. 3 is 1, for explanatory convenience. However, in fact, the number of turns may be 2 or more. In addition, the coils 110 and 210 may be wound In a vortex shape on the same plane, or in a 3D spiral shape.

If the self inductance of the primary circuit coil 110 is denoted as $L_1$, and the self inductance of the secondary circuit coil 210 is denoted as $L_2$, the coupling constant k of the two coils 110 and 210 is expressed by Expression 4-3 using the mutual inductance M. Given this, when circuits are actually designed, the primary circuit and the secondary circuit are each formed to have a Q value that satisfies, for example, the relationship of Expression 2-6 (Condition 2) with respect to the coupling constant k of Expression 4-3. Note that, when the tertiary circuit is also included, the primary to the tertiary circuits can be formed so that the relationship of Expression 3-6 (Condition 4) is satisfied.

$$k = \frac{M}{\sqrt{L_1 L_2}}$$ Expression 4-3

For example, let us consider that a copper wire of 2r=0.8 mm is used to form two square coils having dimensions of a=b=3.8 cm, and the two square coils are arranged apart from each other by a distance of d=1 cm. In this case, M=25 nH, L=120 nH, and k=0.21. For easy calculation, if it is assumed that the Q value of the primary circuit is the same as that of the secondary circuit, the Q value is the inverse of k, and is set to Q=4.8.

For example, the output impedance of the primary circuit and the secondary circuit is set to R=10 Ω. In this case, L=120 nH. Therefore, in order to satisfy the condition of the Q value, C=50 pF is set. Note that, in this case, the resonance frequency is f=60 MHz.

In the above example, it is assumed that the number of turns of each of the coils 110 and 210 is 1. If the number of turns of the primary circuit coil 110 is set to $n_1$ and the number of turns of the secondary circuit coil 210 is set to $n_2$, the mutual inductance M, the self inductance $L_1$ of the primary circuit, and the self inductance $L_2$ of the secondary circuit are respectively determined by Expression 4-4. Note that, as indicated by Expression 4-5, theoretically, the coupling constant k is not determined by the number of turns. In other words, if the number of turns is changed, the Q value that is required for each of the primary circuit and the secondary circuit and that satisfies Expression 2-6 is not changed.

$$M(n_1, n_2) = n_1 \cdot n_2 \cdot M \qquad \text{Expression 4-4}$$
$$L_1(n_1) = n_1^2 L_1$$
$$L_2(n_2) = n_2^2 L_2$$

$$k(n_1, n_2) = \frac{M(n_1, n_2)}{\sqrt{L_1(n_1) \cdot L_2(n_2)}} = \frac{n_1 n_2}{\sqrt{n_1^2 \cdot n_2^2}} \frac{M}{\sqrt{L_1 \cdot L_2}} = k \qquad \text{Expression 4-5}$$

However, the inductances $L_1$ and $L_2$ of the primary circuit and the secondary circuit increase in proportion to the number of turns. Therefore, as can be seen from Expression 2-7, the Q value can be increased by increasing the number of turns. In other words, it is possible to adjust the number of turns of the coils 110 and 210 so that the Q value satisfies Expression 2-6 (or Expression 2). Further, because the resonance frequency can be reduced by increasing the number of turns, the primary circuit and the secondary circuit can be formed by low frequency circuits, namely, relatively simple circuits. For example, the number of turns of the primary circuit and the secondary circuit may be set to 2. In this case, the self inductances of the primary circuit and the secondary circuit are determined as $L_1=L_2=484$ nH, and the mutual inductance is determined as $M=100$ nH. Therefore, if $C=207$ pF, the condition of the Q value can be satisfied. At this time, the resonance frequency becomes $f=15.9$ MHz, and if is found that the primary circuit and the secondary circuit can be formed with a lower frequency than in the case where the number of turns is 1.

When the size of the coils 110 and 210 is changed, when the distance between the coils 110 and 210 is changed, or when the input and output Impedance Is changed, the parameter with which power is optimally transferred can be determined by obtaining k and C in accordance with the above described procedure.

Figure 4:
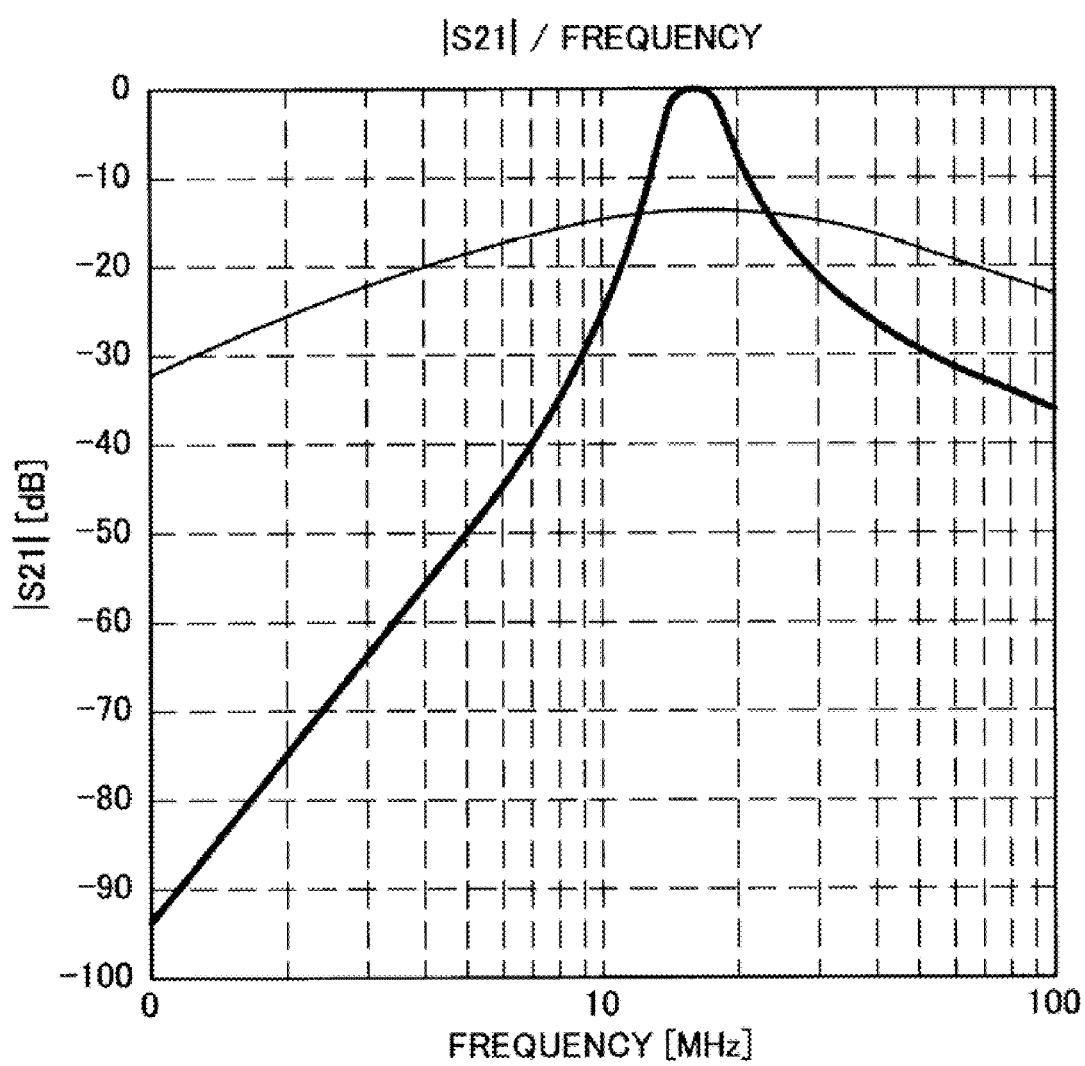
FIG. 4 is an explanatory diagram illustrating, using a calculation result based on the circuit theory, transfer efficiency according to each embodiment of the present invention.

FIG. 4 shows a calculation result of a transfer characteristic, obtained by Expression 2-2, of a transformer connected to the primary circuit and the secondary circuit that satisfy the above-described Condition 1 and Condition 2, or Condition 3 and Condition 4 (also referred to as "the condition of each embodiment of the present invention").

FIG. 4 shows a case where the above-described transformer is connected to a primary circuit and a secondary circuit of a transformer according to the related art, for comparison. In FIG. 4, the transfer characteristic of the transformer according to the related art is shown by a thin line, and the transfer characteristic of the transformer that satisfies the condition of each embodiment of the present invention is shown by a thick line.

As shown in FIG. 4, in the transformer according to each embodiment of the present invention, the transfer characteristic abruptly improves around a resonance frequency of 16 MHz, as compared to the transformer according to the related art. Further, a transfer efficiency of 1 is achieved at the peak of the transfer characteristic. Therefore, even when the coupling constant of the transformer is not 1, if the primary circuit and the secondary circuit are designed to satisfy the condition of each embodiment of the present, invention, it is possible to achieve transfer efficiency of 1.

Simulations of First Embodiment and Second Embodiment

In the above description, the power transfer efficiency is calculated based on the circuit, theory. In order to verity that this phenomenon occurs as an electromagnetic phenomenon, an electromagnetic field simulator was used to calculate a similar transfer characteristic. Here, a calculation result obtained using an electromagnetic field simulator HFSS of ANSOFT corporation is shown.

Figure 5:
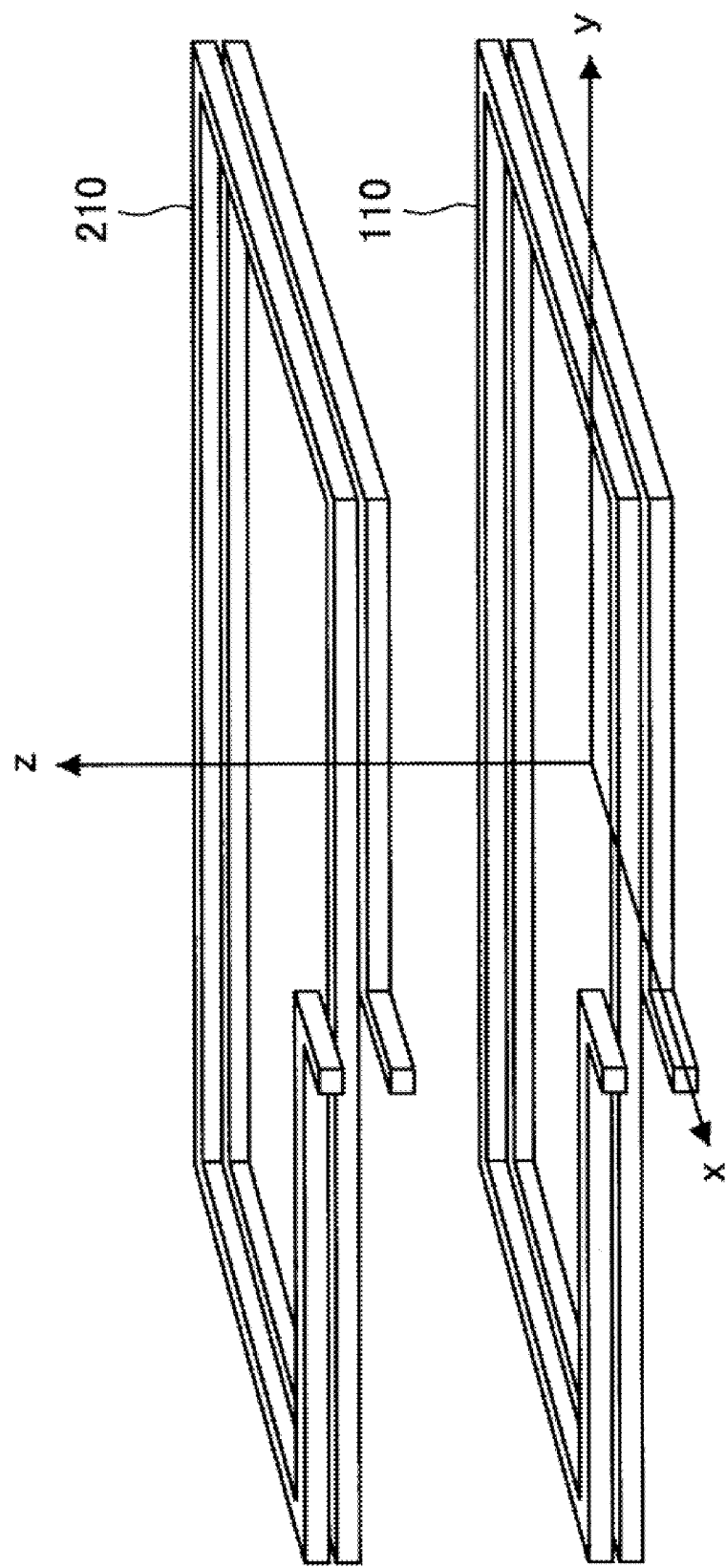
FIG. 5 is an explanatory diagram illustrating, using an electromagnetic field simulation, the coils included in the power transfer device according to each embodiment, of the present invention.

FIG. 5 is a diagram illustrating a model of the coils 110 and 210 according to each embodiment of the present invention, in which the electromagnetic simulator is used for calculation.

In FIG. 5, the square coil 110 on the lower side and the square coil 210 on the upper side have the same size. The length of one side is 3.8 cm, and the cross section of the coil conductor is a square 0.8 mm on each side. The two coils 110 and 210 are arranged apart from each other so that a distance between their centers is just 1cm. In this case, the coil 110 on the lower side is connected to the primary circuit, and the coil 210 on the upper side is connected to the secondary circuit. More specifically, a signal source port and the capacitance $C_1$ are connected in series to both ends of the coil 110 on the primary circuit side. Further, a load port and a capacitance $C_2$ are connected in series to both ends of the coil 210 on the secondary circuit side. The electromagnetic field simulator was used to calculate the transfer characteristic from the signal source port to the load port, namely, an $S_{21}$ parameter.

Figure 6:
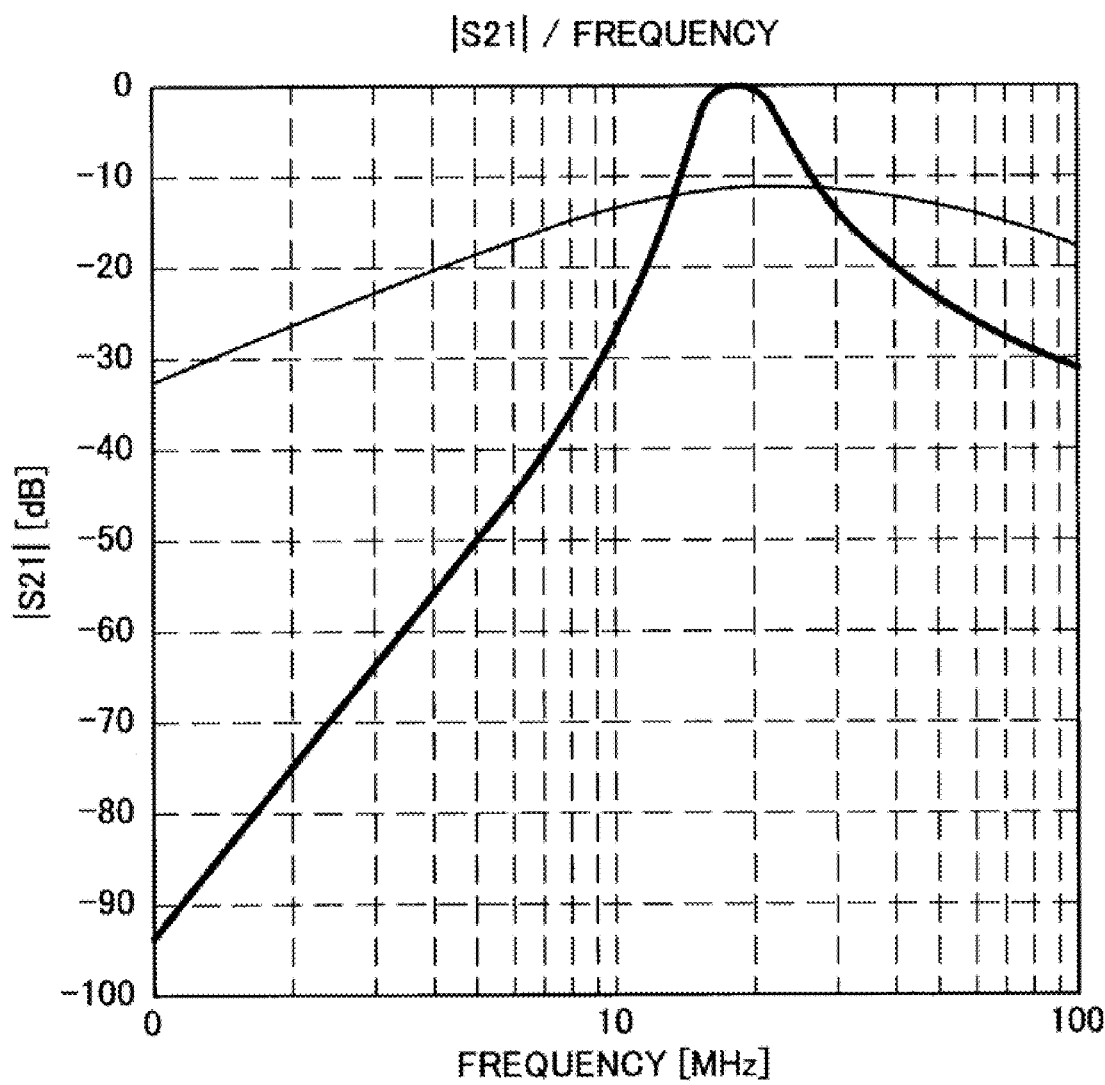
FIG. 6 is an explanatory diagram illustrating, using a calculation result based on the electromagnetic field simulation, the power transfer efficiency according to each embodiment of the present invention.

FIG. 6 shows the transfer characteristic from the signal source port connected to the primary side coil shown in FIG. 5 to the load port connected to the secondary side coil, using the S parameter.

In FIG. 6, the transfer characteristic of the circuits according to the related art Is shown by a thin line. This result is obtained when both the primary side coil 110 and the secondary side coil 210 are directly connected to the ports without passing through the capacitances $C_1$ and $C_2$. Further, the transfer characteristic obtained by the circuits that satisfy the condition of each embodiment of the present invention is shown by a thick line.

As shown in FIG. 6, it can be found that a transfer efficiency of 1 (0 dB) is achieved around a resonance frequency of 20 MHz, in the circuits according to each embodiment of the present invention. This result matches the theoretical calculation well, and it can be verified that the power transfer device according to each embodiment of the present invention exerts an effect, also when the electromagnetic simulation is used.

Figure 7:
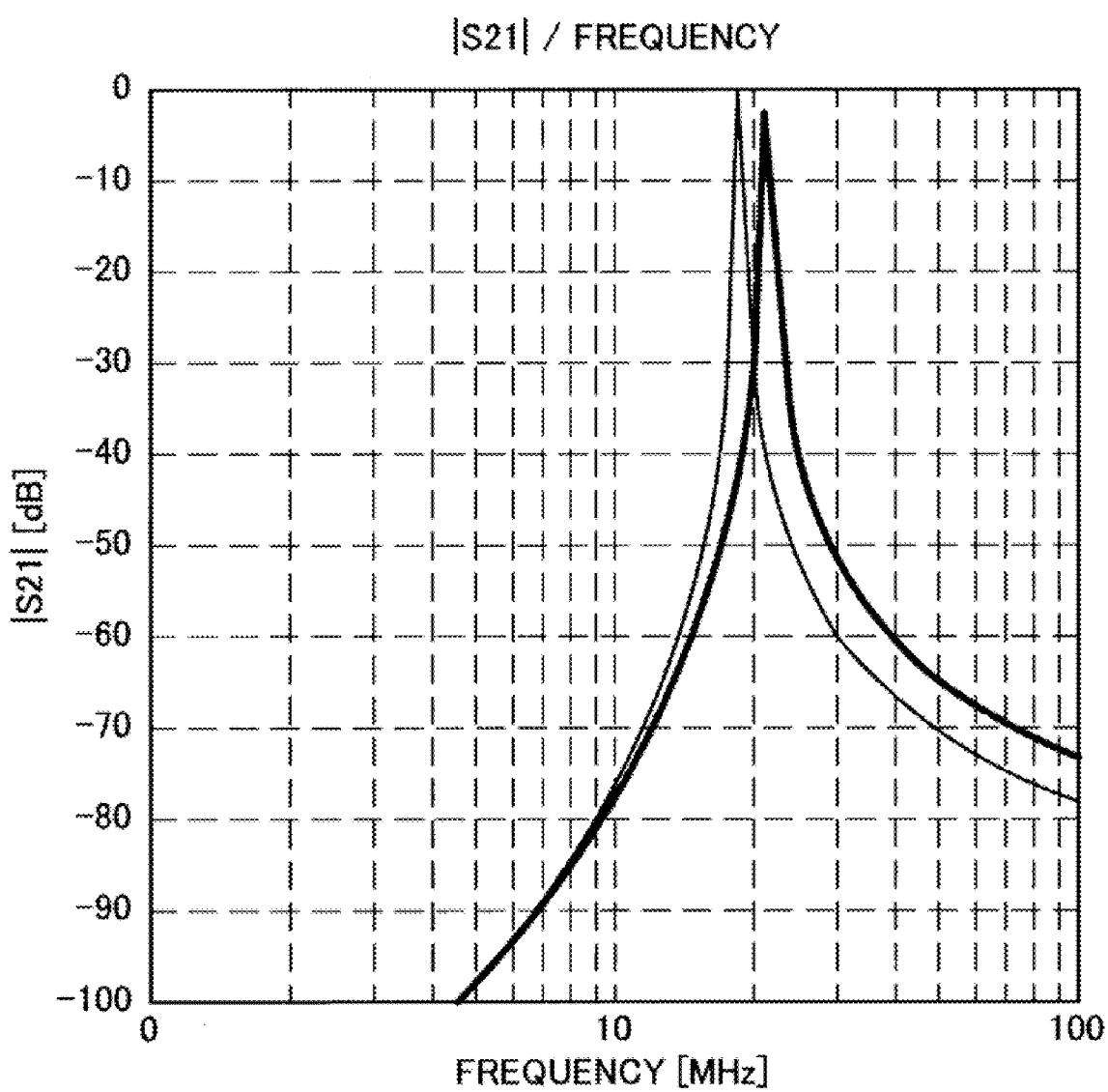
FIG. 7 is an explanatory diagram illustrating, using a calculation result based on the electromagnetic field simulation, the power transfer efficiency according to each embodiment of the present invention.

FIG. 7 is a graph showing the transfer characteristic obtained when the distance between the two coils shown In FIG. 5 Is set to 5 cm and a parameter that satisfies the condition of each embodiment of the present invention is applied.

When the distance between the coils is set to 5 cm, the coupling constant is calculated to be 0.018 from Expression 4-1, Expression 4-2 and Expression 4-3. When the signal source Impedance and the load impedance are set to 1 Ω, and the capacitances $C_1$ and $C_2$ that satisfy the condition of each embodiment of the present invention are calculated, 151 pF is obtained. At this time, the resonance frequency is 19 MHz.

FIG. 7 shows both the theoretical calculation result of Expression 2-2 and the result obtained by the electromagnetic field simulation. In FIG. 7, the thick line indicates the electromagnetic field simulation result, and the thin line indicates the theoretical calculation result. When comparing the theoretical calculation result of Expression 2-2 with the electromagnetic field simulation result, a slight difference in resonance frequency is seen. However, it can be confirmed that the transfer efficiency is approximately 1 (0 dB) in both results. The reason why the transfer efficiency is a little less than 1 in the electromagnetic field simulation can be attributed to the frequency resolution during the calculation.

As described above, the power transfer device according to each embodiment of the present invention can improve the energy transfer efficiency of a non-closed magnetic circuit transformer. Note that the term "non-closed magnetic circuit transformer" used herein may include a transformer having the two coils 110 and 210 that are away from each other by a distance of almost twice the width of the coils 110 and 210, namely, a transformer having the coils 110 and 210 that are apart from each other by a substantial distance. In other words, the power transfer device according to each embodiment of the present invention can achieve an energy transfer efficiency of close to 1 even in such a case.

Following the overview of each embodiment of the present invention, the first embodiment and the second embodiment of the present invention have been described above. The above-described power transfer device according to each embodiment of the present Invention can improve the power transfer efficiency by arranging the capacitance in the primary circuit and the secondary circuit (and the tertiary circuit) and by satisfying the condition of each embodiment of the present invention. Note that, in the power transfer device according to each embodiment of the present invention, the description has been given for the case where the power supply source is connected to the primary circuit. In each of the above-described embodiments, the power supply source is not particularly limited. However, if a power supply source including an oscillator circuit suitable for each of the above-described embodiments is used, it is possible to further improve the power transfer efficiency while providing stability. Given this, an example in which an oscillator circuit etc. is used as a power supply source will now be described.

Power Transfer Device According to Third Embodiment

Figure 8A:
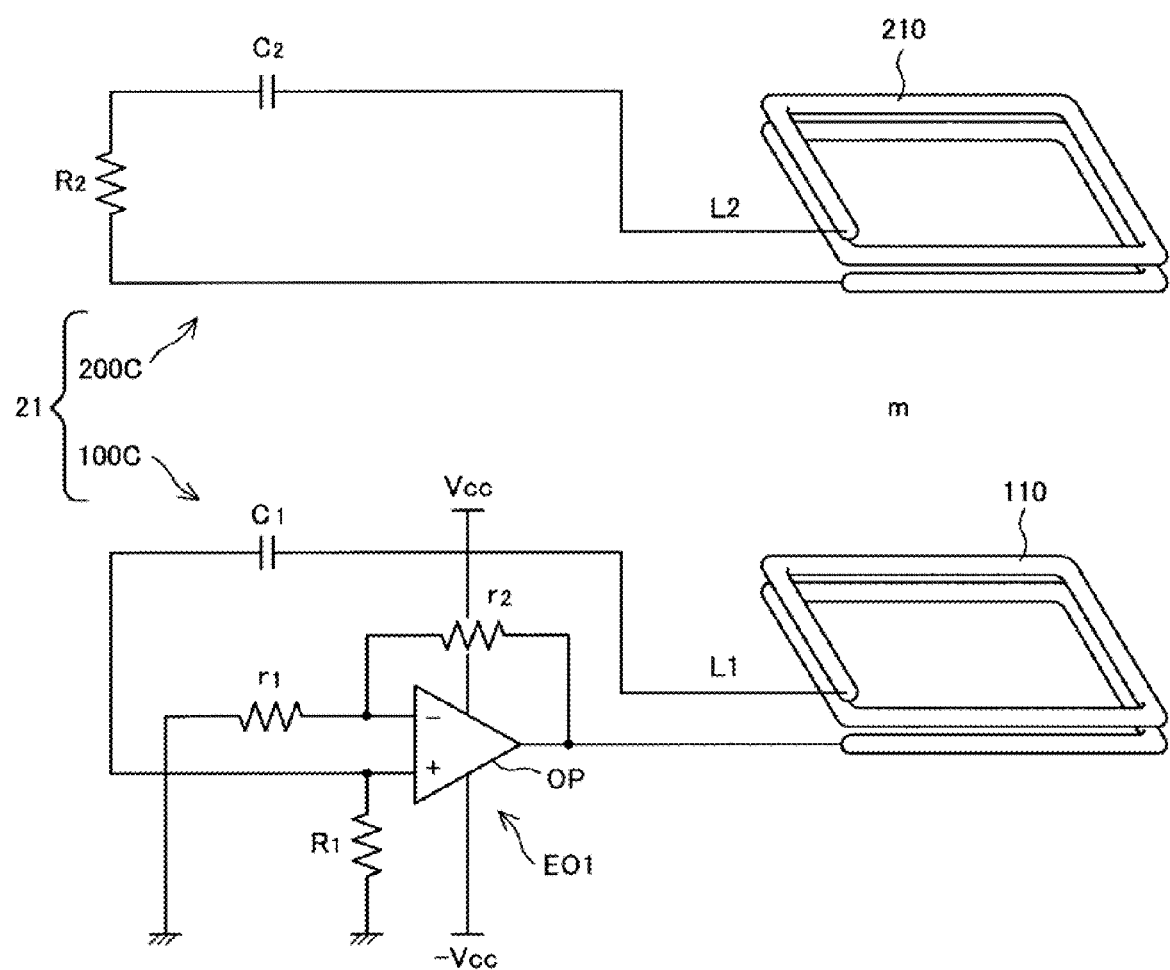
FIG. 8A is an explanatory diagram illustrating a power transfer device according to a third embodiment of the present invention.

FIG. 8A is a circuit diagram illustrating a power transfer device according to a third embodiment of the present invention. A primary circuit of a power transfer device 21 is illustrated in the lower section of FIG. 8A, and a secondary circuit is illustrated in the upper section. The primary circuit and the secondary circuit are basically formed as described in, for example, the overview of each embodiment of the present invention, but are different in that the primary circuit includes a particular oscillator circuit as a power supply source. Note that, in the following description, the primary circuit is referred to as a power supply device (a power supply device 100C), the secondary circuit (and a tertiary circuit) is referred to as a power receiving device (a power receiving device 200C).

As shown in FIG. 8A, the power supply device 100C according to the third embodiment, includes the power transfer coil 110, the resonance capacitance (condenser) $C_1$, and an oscillator circuit EO1 that, uses an amplifier (for example, an operational amplifier OP). In the power supply device 100C shown in FIG. 8A, a series LC resonance circuit, which is formed by the power transfer coil 110 and the resonance capacitance $C_1$, is connected between the input and the output of the operational amplifier OP, thereby forming a positive feedback loop.

Both ends of the series resonance circuit formed of the power transfer coil 110 and the capacitance $C_1$ are respectively connected to a + input section and an output section of the operational amplifier OP. The + input section of the operational amplifier OP is connected to a reference potential via the resistance $R_1$. Further, a input section of the operational amplifier OP is connected to a − reference potential via a resistance $r_1$, and connected to the output section via a resistance $r_2$ that forms a negative feedback loop (a non-inverting amplifier), thereby achieving the effect of the amplifier. In this manner, the oscillator circuit is realized.

Power Transfer Device According to Fourth Embodiment.

Figure 8B:
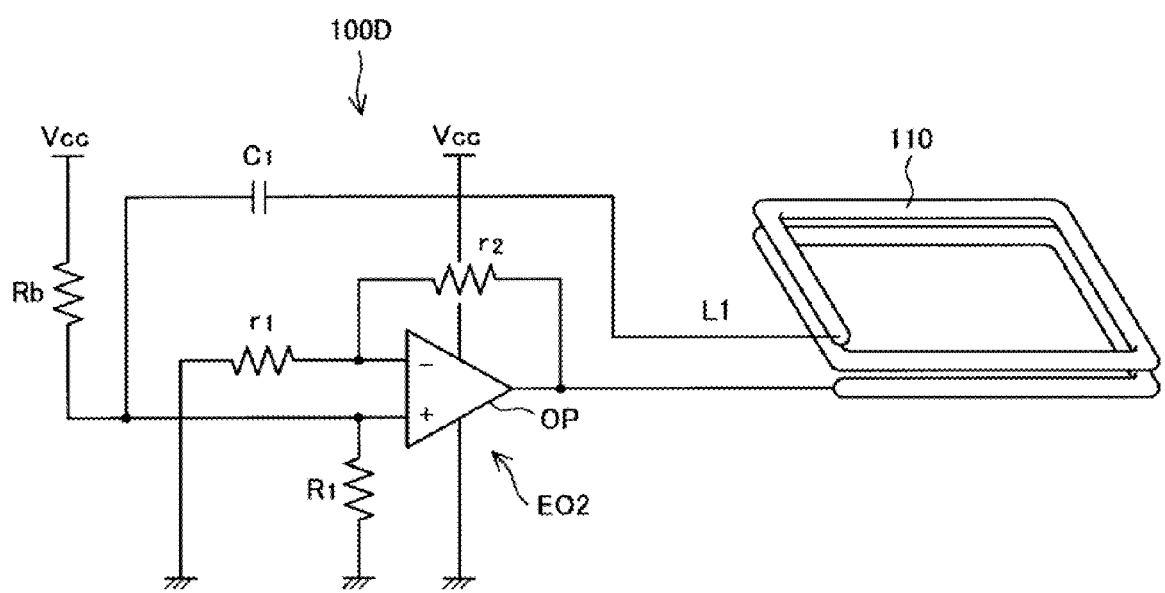
FIG. 8B is an explanatory diagram illustrating a power transfer device according to a fourth embodiment of the present invention.

FIG. 8B is a circuit diagram illustrating a power supply device of a power transfer device according to a fourth embodiment of the present invention. FIG. 8B shows an example in which a power supply device 100D of the fourth embodiment uses a single power supply as the operational amplifier OP. If a single power supply is used as the operational amplifier OP, a resistance $R_b$ is further used to give a bias to the output.

In the third and fourth embodiments of the present invention shown in FIG. 8A and FIG. 8B, examples are shown in which the operational amplifier OP is used as the amplifier. However, a simple; amplifier may be used as the amplifier, or an amplification circuit using a transistor may be used.

In the power supply devices 100C and 100D according to the third and fourth embodiments of the present invention shown in FIG. 8A and FIG. 8B, the series resonance circuit including the power transfer coil 110 is formed as a positive feedback loop. However, this circuit section may take the form of a negative feedback loop. For example, when the phase of the carrier wave is shifted by it between the input and the output of the amplifier, the carrier wave is reversed. Accordingly, in order to substantially change the negative feed back loop to the positive feedback loop, it is possible to use; a reverse amplifier as the amplifier. The power supply devices 100C and 100D according to the third and fourth embodiments of the present invention include a circuit that operates as a positive feedback loop and induces oscillation, even if the form of the circuit is not a positive feedback loop.

Moreover, when information is sent from the power supply devices 100C and 100D, it is also possible to modulate a carrier wave in accordance with the information, for example, by connecting a field effect transistor (not shown in the figures) to the power source or the feedback loop of the operational amplifier OP and by cutting the connection of the circuit to thereby perform switching.

Features of Power Transfer Devices According to Third Embodiment and Fourth Embodiment The oscillator circuit EO1 shown in FIG. 8A and an oscillator circuit EO2 shown In FIG. 8B, which each Include the power transfer coil 110, have the following features.

1. AH the output current of the oscillator circuit passes through the power transfer coil 110.

2. The oscillator circuit follows the resonance frequency change caused by approach of the secondary circuit.

First Feature

As can be seen from the circuit configurations in FIG. 8A and FIG. 8B, the output from the operational amplifier OP is connected only to the coil 110 except the resistance $r_2$, that stabilizes the amplification operation. Therefore, it can be easily understood that the oscillator circuits EO1 and EO2 have the above-described first feature for all the output from the amplifier that uses the operational amplifier OP. With the first feature, the power transfer devices according to the third and fourth embodiments can effectively supply the oscillated power to the load side.

Instead of the oscillator circuits shown in FIG. 8A and FIG. 8B of the third and fourth embodiments, it is also conceivable to use a well known LC oscillator circuit, such as a Colpitts circuit or a Hartley circuit, as a fifth embodiment and a sixth embodiment of the present invention.

Figure 9A:
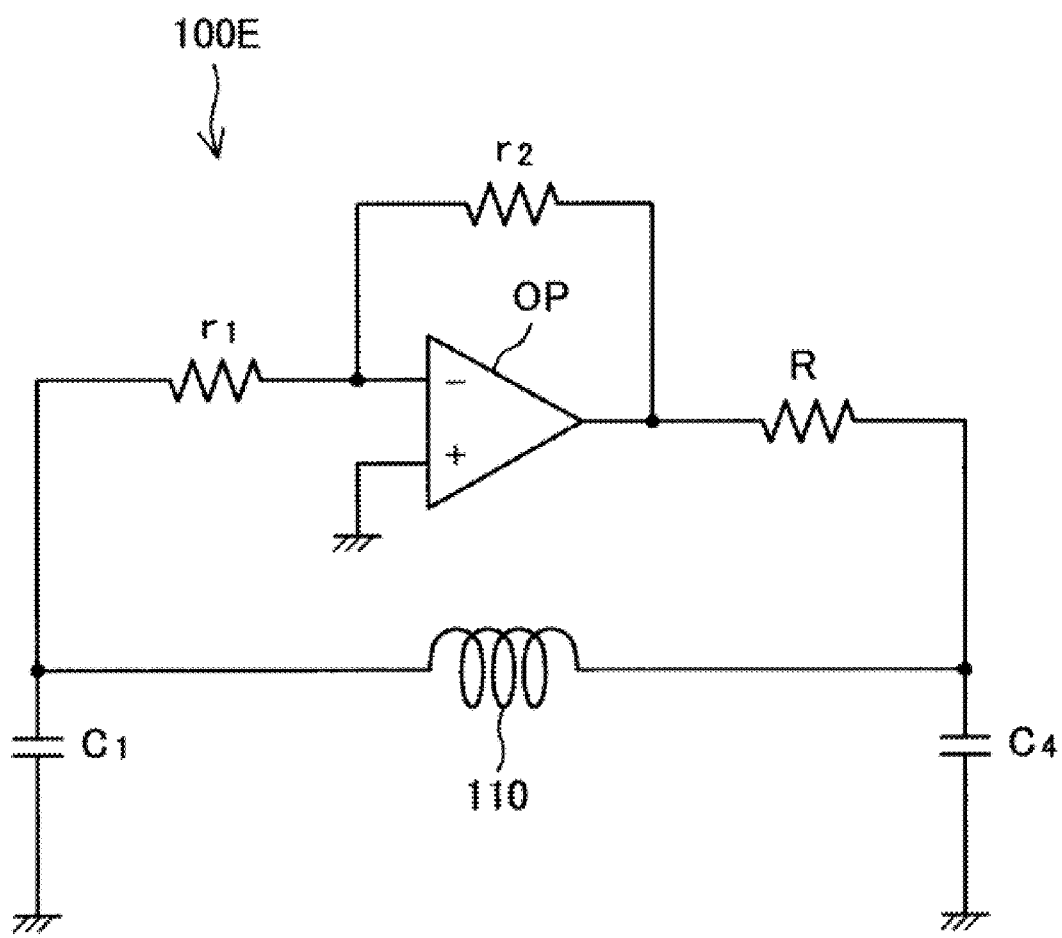
FIG. 9A is an explanatory diagram illustrating a power transfer device according to a fifth embodiment of the present invention.
Figure 9B:
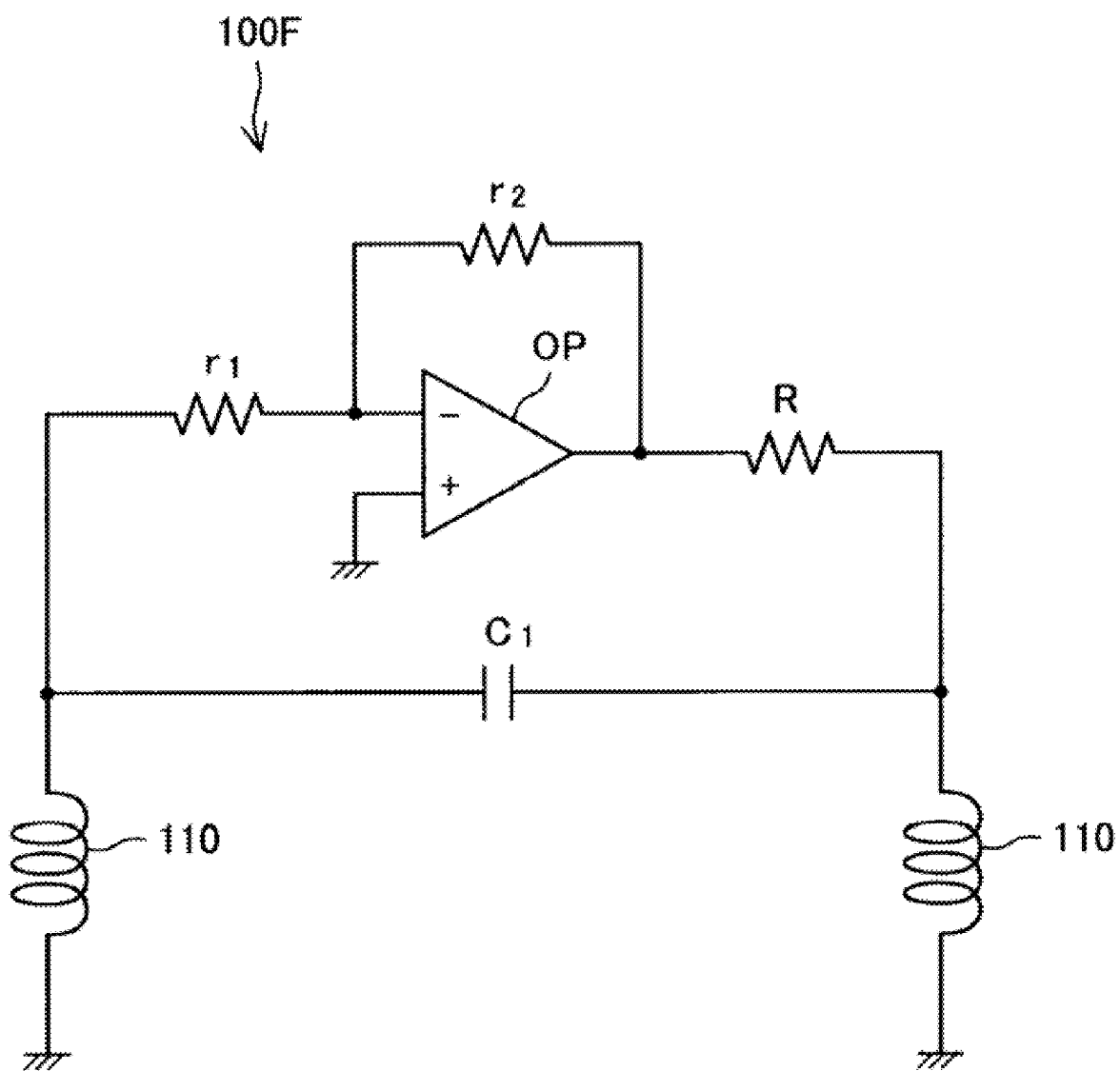
FIG. 9B is an explanatory diagram illustrating a power transfer device according to a sixth embodiment of the present invention.

FIG. 9A shows an example of a Colpitts oscillator circuit EO3 that uses the operational amplifier OP. Its feedback loop section includes the coil 110 and two capacitances $C_1$ and $C_4$, which form a π-shaped filter. FIG. 9B shows an example of a Hartley oscillator circuit EO4 that, uses the operational amplifier OP. Its feedback loop section Includes the capacitance $C_1$ and the two coils 110, which form a π-shaped filter.

In practicing the fifth and sixth embodiments, the coil 110 sections of the oscillator circuits EO3 and EO4 can be used as power transfer coils and thereby form power transfer devices. However, the coil 110 sections do not receive all the output from the operational amplifier OP, and the current flowing therethrough does not include all the output from the operational amplifier OP. Therefore, when the oscillator circuits EO3 and EO4 according to the fifth and sixth embodiments are used, the power usage efficiency is not high.

On the other hand, as shown in FIG. 8A and FIG. 8B, the above-described third and fourth embodiments use the oscillator circuits EO1 and EO2 that have a particular circuit configuration designed to cause all the current output from the operational amplifier OP to flow through the coil 110 section. Therefore, with the oscillator circuits EO1 and EO2, both ends of the series resonance circuit formed of the power transfer coil 110 and the capacitance $C_1$ are respectively connected to the + input section and the output section of the operational amplifier OP. Further, any other element, except the coil 110 and the resistance $r_2$ that forms the negative feedback loop to achieve the effect of the amplifier, is not connected to the operational amplifier OP. In other words, only the coil 110 is connected to the output section of the amplifier that uses the operational amplifier OP. As a result, the power transfer devices according to the third and fourth embodiments can apply all the current output from the amplifier to the coil 110. Thus, the oscillating power can be effectively supplied to the load side.

Second Feature

Figure 10:
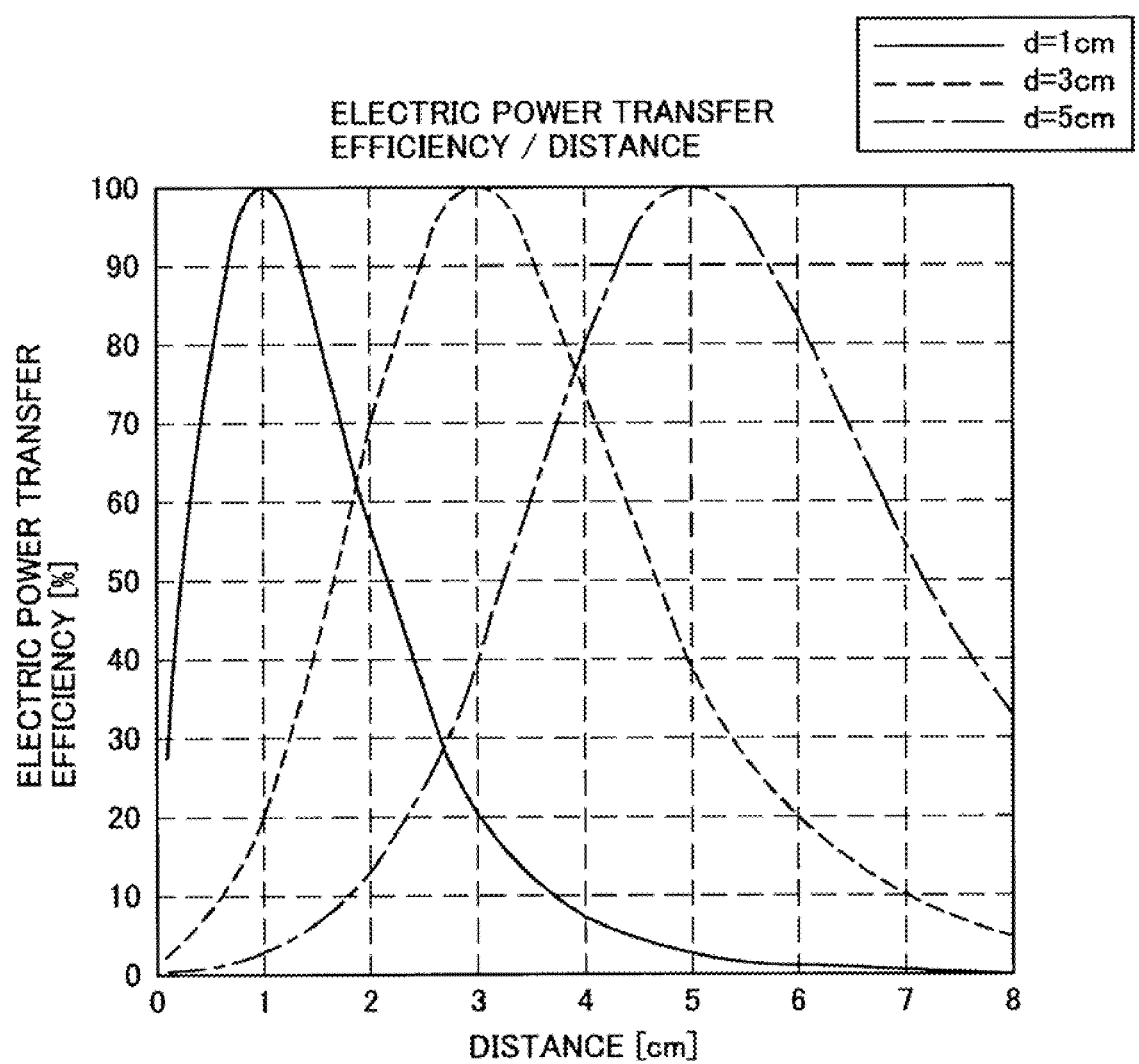
FIG. 10 is an explanatory diagram illustrating how power transfer efficiency changes with respect to a distance between the coils, in the power transfer device according to each embodiment of the present invention.

In order to explain the second feature, first, a phenomenon in which the resonance frequency varies with respect to the distance between the two coils 110 and 210 will be described. FIG. 10 is a graph illustrating the relationship between a distance d between the two coils 110 and 210 and the power transfer efficiency. Note that the power transfer efficiency shown in FIG. 10 is the square of the transfer gain, and obtained by calculating $|S_{21}|$ from a scattering parameter (S parameter).

FIG. 10 shows results of three kinds of circuits. The solid line curve in FIG. 10 indicates a distance dependence characteristic of the power transfer efficiency of the circuit that is optimized when the distance between the coils is 1 cm. The dashed line curve indicates a distance dependence characteristic of the power transfer efficiency when the distance between the coils is 3 cm. The dot-dash line indicates a distance dependence characteristic of the power transfer efficiency when the distance between the coils is 5 cm.

In FIG. 10, the abscissa axis represents the distance between the coils, while the ordinate axis represents the power transfer efficiency. The power transfer efficiency of the three curves becomes 1 when the distance between the coils is 1 cm, 3 cm and 5 cm, respectively, which coincide with the optimized distance. If the distance between the coils is reduced or increased with respect to the aforementioned distances, the transfer efficiency decreases.

One of the reasons why the transfer efficiency decreases when the distance between the coils is increased is that the coupling constant k decreases. When the distance between the coils is reduced, the transfer efficiency decreases despite the fact that the coupling constant k increases. In order to explain the reason why the transfer efficiency decreases, the experiment result of the frequency characteristic when the distance between the coils Is reduced from an appropriate distance will be described.

Figure 11:
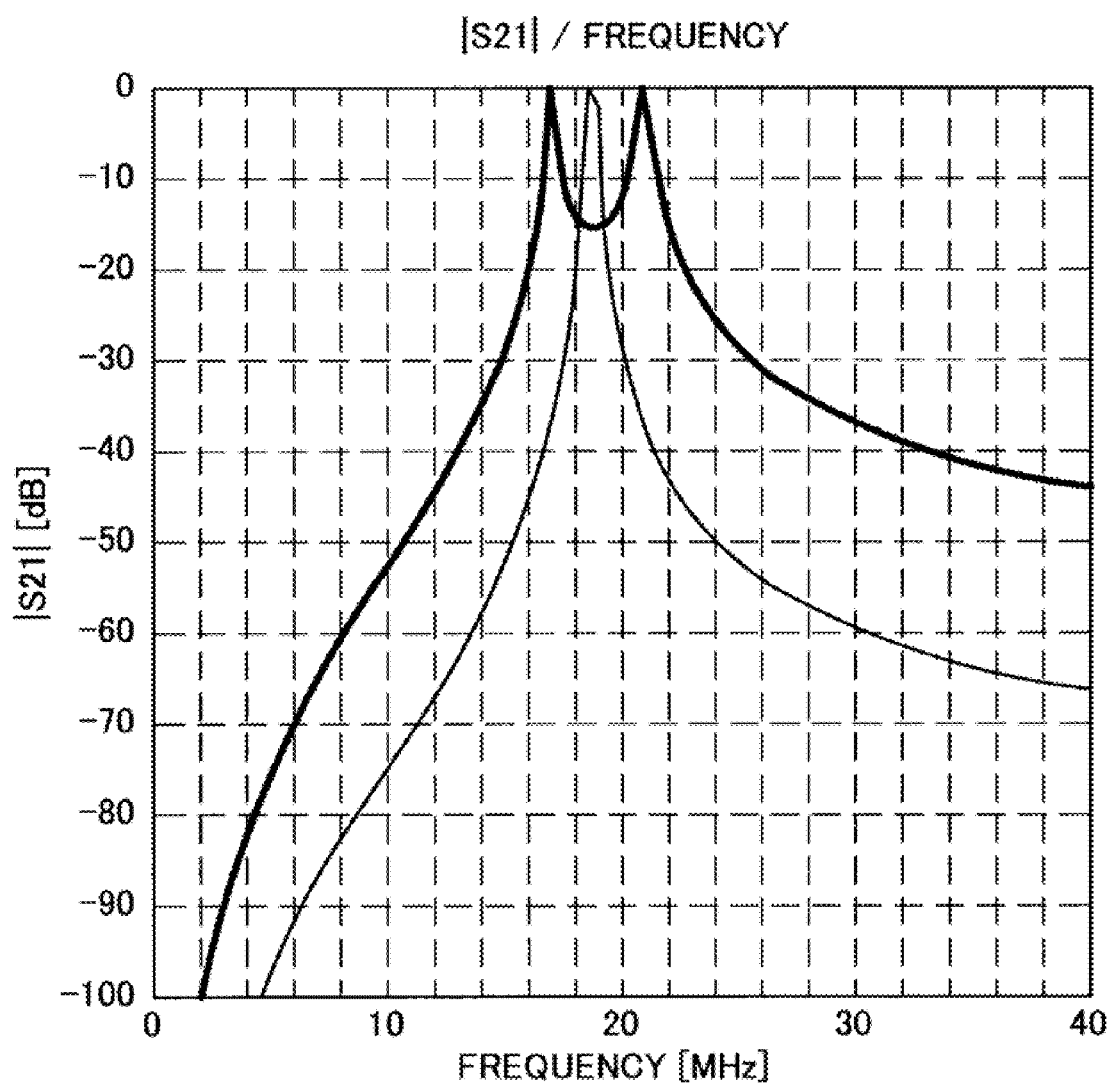
FIG. 11 is an explanatory diagram illustrating a frequency characteristic when the distance between the coils is reduced in the power transfer device; according to each embodiment of the present invention.

FIG. 11 is a diagram that compares the transfer characteristics obtained when the distance d between the coils is 5 cm and 1 cm, for a circuit that is adjusted so that the transfer efficiency becomes 1 when the distance d between the coils is 5 cm and the resonance frequency is 19 MHz. The thin line shows the transfer efficiency when the distance d between the coils is 5 cm, and the thick, line shows the transfer efficiency when the distance d between the coils is 1 cm.

As described earlier, when the distance d between the coils is 5 cm, the circuit, resonates at 19 MHz. However, if the distance d between the coils is further reduced, the resonance frequency splits into two. When the distance d between the coils is reduced to 1 cm, it can be seen that there are two resonances of 17 MHz and 21 MHz. At this time, the transfer efficiency at the original resonance frequency of 19 MHz is attenuated by 10 dB or more, and this is the cause of the attenuation of the transfer efficiency when the inter-coil distance is reduced, At the split resonance frequencies (17 MHz and 21 MHz), it can be considered that impedance matching is established because the transfer efficiencies are equal to 1. Then, in order to Investigate the split resonance frequencies in detail, impedance matching conditions for the signal source and the load of the primary circuit were considered.

Expression 5-1 indicates the impedance matching conditions. Note that impedances $Z_1$ and $Z_2$ in Expression 5-1 are series impedances of the primary circuit and the secondary circuit, and given by Expression 5-2.

$$2r_1 = \text{Re}\left[Z_1 + \frac{m^2\omega^2}{Z_2}\right] \quad \text{Expression 5-1}$$

$$0 = \text{Im}\left[Z_1 + \frac{m^2\omega^2}{Z_2}\right]$$

$$Z_i = r_i + j\omega L_i + \frac{1}{j\omega C_i} \quad \text{Expression 5-2}$$

Next, an oscillation condition for the oscillator circuit EO1 shown in FIG. 8A will be considered with respect to the distance between the coils 110 and 120.

The oscillation condition for the oscillator circuit EO1 according to the third embodiment of the present invention shown in FIG. 8A can be obtained from an open-loop transfer function. Therefore, the open-loop transfer function is calculated first. The open-loop transfer function is obtained from Expression 5-3. The first term of Expression 5-3 indicates the amplification factor of an amplifier (for example, the operational amplifier OP) and the second term indicates the ratio of the output voltage to the input voltage of the amplifier, which is obtained by the law of partial pressure. The oscillation condition for the oscillator circuit EO1 is given by Expression 5-4.

$$H(\omega) = \frac{r_1 + r_2}{r_1} \cdot \frac{R_1}{Z_1 + \frac{m^2\omega^2}{Z_2}} \quad \text{Expression 5-3}$$

$$\text{Re}[H(\omega)] \geq 1 \quad \text{Expression 5-4}$$
$$\text{Im}[H(\omega)] = 0$$

A frequency condition (the second row of Expression 5-4) is completely the same as a frequency condition of Expression 5-1, and it can be found that the oscillator circuit EO1 oscillates at the split resonance frequencies.

Therefore, even when the second circuit (namely, the coil 210) is moved closer and the resonance frequency changes, the oscillator circuit EO1 consistently oscillates at the resonance frequencies and generates an optimal carrier wave to transfer power. Note that, from the amplitude condition for oscillation (the first row of Expression 5-4), it can be found that the amplification factor of the amplifier must be 2 or more.

The same principle applies to the above-described oscillator circuit EO2 according to the fourth embodiment. Because the power transfer devices according to the third and forth embodiments of the present invention respectively include the oscillator circuit EO1 and the oscillator circuit EO2, they can cause the oscillating frequency to follow an optimal value even if the distance d between the coils 110 and 120 is reduced. Therefore, the power transfer devices can maintain a high level of power transfer efficiency.

Next, the power receiving device will be described using the power receiving device 200C shown in the upper section of FIG. 8A as an example. The coil 210 for receiving power, the capacitance; $C_2$ for causing LC resonance, and the resistance $R_2$ are connected to the power receiving device 200C shown in the upper section of FIG. 8A. The resistance $R_2$ serving as a load may be a simple load such as an electric bulb. Alternatively, a circuit with, an input, impedance of $R_2$ may be used instead of the resistance $R_2$. In this case, each embodiment, of the present invention can be realized by determining each circuit constant in accordance with Expression 2-6.

On the other hand, it is also conceivable that the secondary circuit 200 is connected to the tertiary circuit 300 via the transformer T2 or the like, as shown in FIG. 1B. In this case, the coupling constant of the transformer T2 is preferably as close as possible to 1. In this case, each circuit constant is determined in accordance with Expression 3-6. Further, it is also conceivable that a rectifier circuit, particularly a full-wave rectifier circuit, could be connected to the tertiary circuit 300 to allow AC/DC conversion to be performed. An example of this case will be described in a seventh embodiment and an eighth embodiment. Note that, in the seventh and eighth embodiments, a similar structure can be used for the power supply device (a primary circuit), except that the power supply device has a circuit constant in accordance with Expression 3-6 (Condition 4). Therefore, in the following description, the power receiving device (a secondary circuit and a tertiary circuit) will be described.

Power Transfer Device According to Seventh Embodiment

Figure 12:
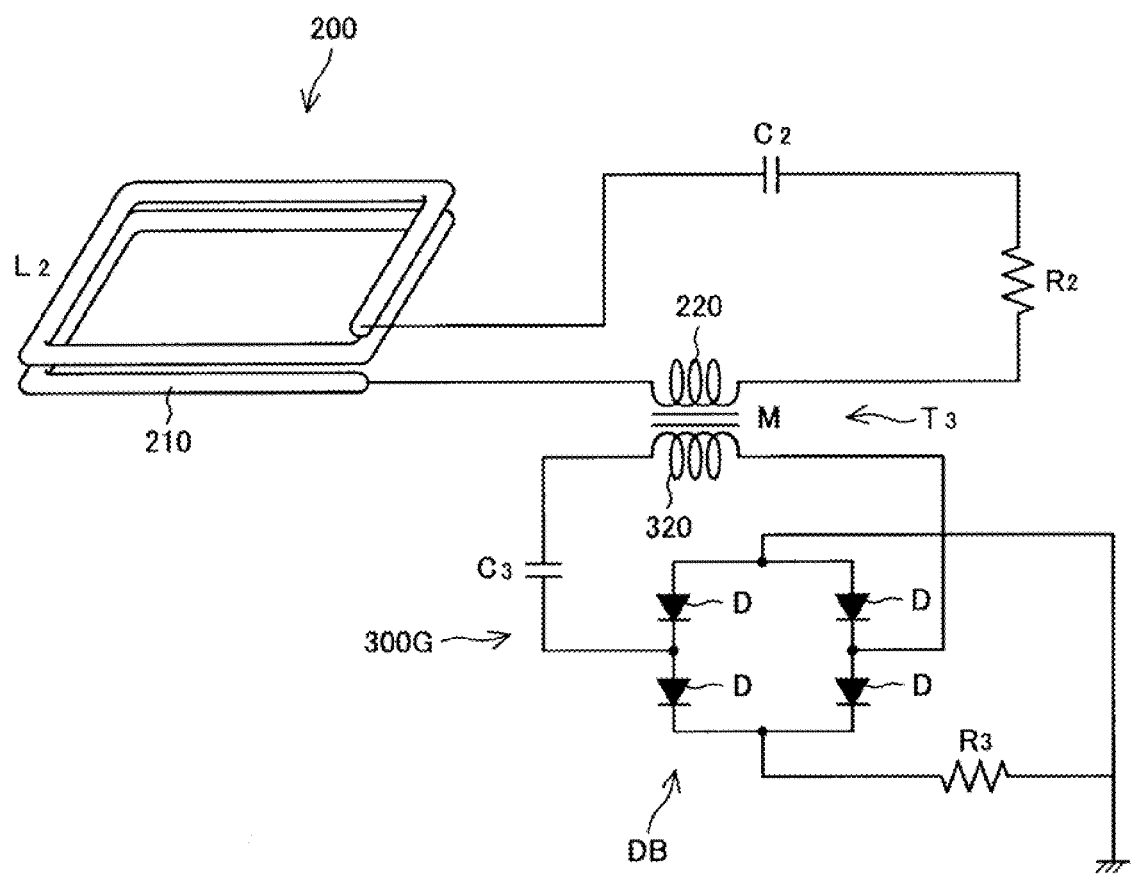
FIG. 12 is an explanatory diagram illustrating a power transfer device according to a seventh embodiment of the present invention.

FIG. 12 is an explanatory diagram illustrating the power transfer device according to the seventh embodiment of the present invention.

A circuit example is shown on the power receiving device side of the power transfer device according to the seventh embodiment, shown in FIG. 12. In this circuit, the secondary circuit 200 and a tertiary circuit 300G are connected by a transformer T3, and both ends of the tertiary circuit 300G of the transformer T3 are connected to a diode bridge DB formed of four diodes D so as to perform full-wave rectification. However, the capacitance $C_3$ is serially interposed between the transformer T3 and the diode bridge DB, unlike a normal diode bridge DB. The capacitance $C_3$ is determined so that the tertiary circuit 300G resonates at the same frequency as that of the primary circuit 100 and the secondary circuit 200.

Half-wave rectification can also be used as a method for performing AC/DC conversion. However, full-wave rectification is desirable in this case. This is because, when viewed from the transformer T3 of the tertiary circuit 300G, if a full-wave rectification circuit is used, it can be viewed as a resonance circuit and treated as a circuit similar to that shown in FIG. 1B. However, if a half-wave rectification circuit is used, it cannot be viewed as a resonance circuit. For a similar reason, it is not desirable to provide the capacitance $C_3$ at a later stage of the circuit than the diode bridge DB. More specifically, it is desirable to provide the capacitance $C_3$ at a position between the tertiary side coil 320 and the diode bridge DB. Note that the description here omits an explanation about an element that performs a filtering process to remove high frequencies generated in the full-wave rectification.

Power Transfer Device According to Eighth Embodiment

Figure 13:
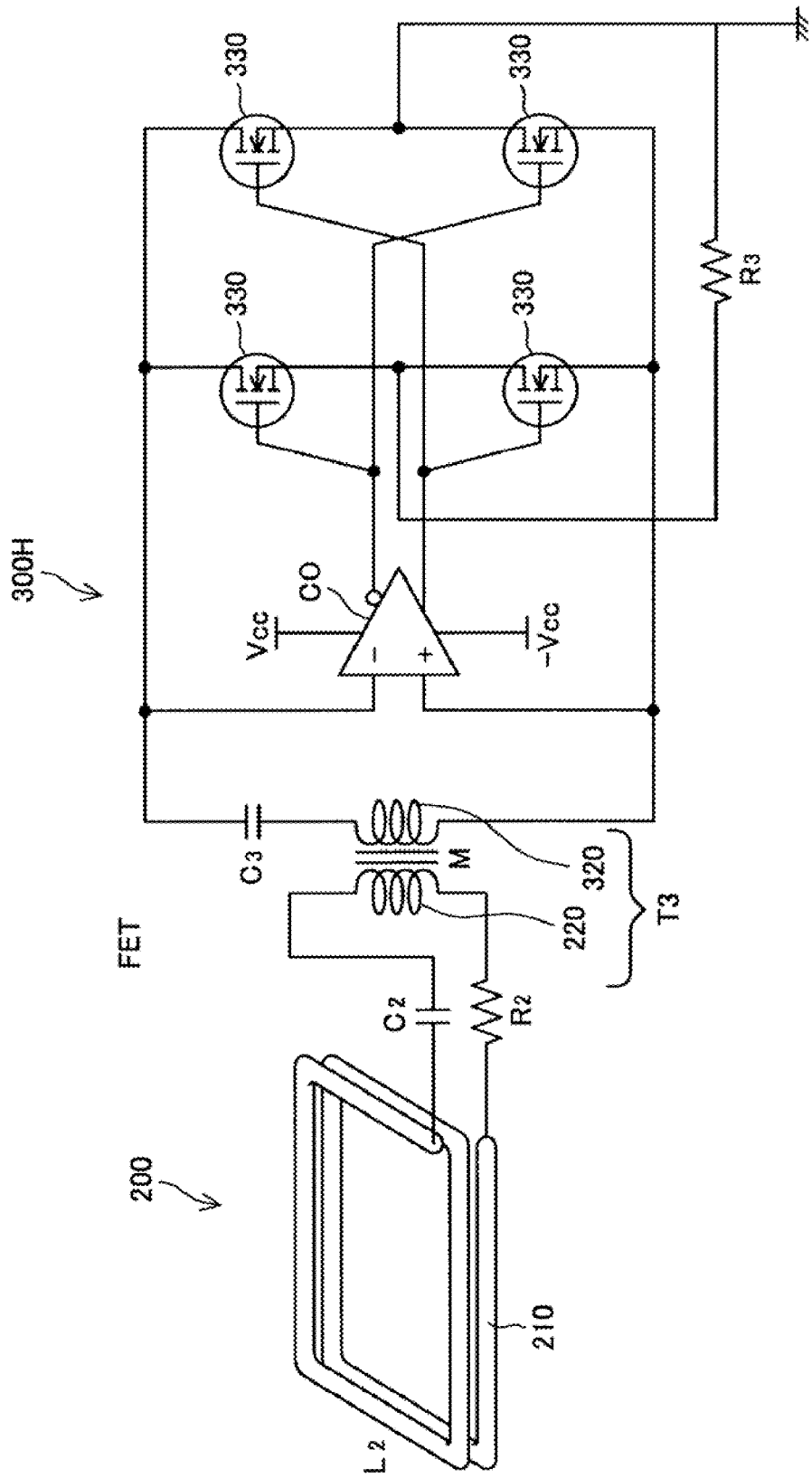
FIG. 13 is an explanatory diagram illustrating a power transfer device according to an eighth embodiment of the present invention.

FIG. 13 is an explanatory diagram illustrating a power transfer device according to the eighth embodiment of the present invention.

The full-wave rectification circuit formed by the diode bridge DB shown in FIG. 12 is not necessarily suitable for obtaining high efficiency. This is because there is a voltage loss until the diodes D start to operate. Therefore, for example, it is also conceivable to provide a full-wave rectification circuit that uses a comparator CO and a field effect transistor (FET) 330 as shown in FIG. 13.

Instead of using diodes D for rectification, this circuit uses the comparator CO and the FET 330, which are active elements, to perform rectification. Thus, this circuit eliminates the: voltage loss that would be caused if the diodes D were used.

In this circuit, immediately when the polarities at the both ends of the transformer T3 are reversed, the output of the comparator CO is switched, the FET 330 to be switched changes, and the current, constantly flows In the same direction on the load side. It is desirable to use the FET 330 that causes only a very small loss, and to use the comparator CO that operates at high speed. With this configuration, a voltage reduction such as that caused by rectification of the diodes D can be eliminated, and rectification loss can be reduced.

However, in this case, a separate power source is required because the comparator CO is an active element. Moreover, in order to improve overall power usage efficiency, it is desirable that the power to drive the comparator CO is sufficiently small compared to the power supplied by the power transfer device.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2008-168847 filed in the Japan Patent Office on Jun. 27, 2008, the entire content of which is hereby Incorporated by reference.

What is claimed is:

1. A power transfer device comprising:
   a transformer that couples a primary circuit and a secondary circuit and has a coupling constant of less than one; and
   capacitances that are respectively provided in the primary circuit and the secondary circuit, and connected in series with coils that form the transformer, wherein
   circuit constants of the primary circuit and the secondary circuit are set so that the primary circuit and the secondary circuit resonate at the same frequency and a product of the square of the coupling constant, a Q value of the primary circuit and a Q value of the secondary circuit is one, and
   the primary circuit transfers power to the secondary circuit by means of the transformer, using a carrier wave having the resonance frequency.

2. A power transfer device comprising:
   a first transformer that couples a primary circuit and a secondary circuit and has a coupling constant of less than one;

a second transformer that couples the secondary circuit and a tertiary circuit; and capacitances that are respectively provided in the primary circuit, the secondary circuit and the tertiary circuit, and connected in series with coils that form one of the first transformer and the second transformer, wherein circuit constants of the primary circuit, the secondary circuit and the tertiary circuit are set so that the primary circuit, the secondary circuit and the tertiary circuit resonate at the same frequency and a product of the square of the coupling constant of the first transformer, an inductance and a resistance of the primary circuit is equal to a product of the square of a coupling constant of the second transformer, an inductance and a resistance of the tertiary circuit, and the primary circuit transfers power to the tertiary circuit via the secondary circuit by means of the first transformer and the second transformer, using a carrier wave having the resonance frequency.

3. The power transfer device according to claim 1 or 2, wherein the primary circuit further includes an oscillator circuit including an amplifier in which an output current is positively feedbacked at the resonance frequency through a resonance circuit including the coil and the capacitance.

4. The power transfer device according to claim 3, wherein an amplification factor of the amplifier is at least two.

5. The power transfer device according to claim 3, wherein the amplifier is connected to the resonance circuit so that all the output current passes through the resonance circuit.

6. The power transfer device according to claim 1 or 2, wherein the transformer has no magnetic material core that, forms a closed magnetic circuit.

7. The power transfer device according to claim 1 or 2, wherein the primary circuit modulates the carrier wave in order to transfer information together with power.

8. The power transfer device according to claim 2, wherein the tertiary circuit, further includes a full-wave rectification circuit that full-wave rectifies power obtained by the second transformer, and the capacitance of the tertiary circuit is arranged between the coil that forms the second transformer and the full-wave rectification circuit.

9. The power transfer device according to claim 8, wherein the full-wave rectification circuit is formed by a plurality of active elements.

10. A power supply device comprising:

a primary circuit including a coil that forms a transformer having a coupling constant of less than one with a coil of a power receiving device to be coupled with, the power receiving device having a secondary circuit that includes the coil and a capacitance connected in series, and a capacitance that is connected In series with the coil of the primary circuit, wherein a circuit constant of the primary circuit is set so that the primary circuit and the secondary circuit resonate at the same frequency and a product of the square of the coupling constant, a Q value of the primary circuit and a Q value of the secondary circuit is one, and the primary circuit transfers power to the secondary circuit by means of the transformer, using a carrier wave having the resonance frequency.

11. A power receiving device comprising:

a secondary circuit including a coil that forms a transformer having a coupling constant of less than one with a coil of a power supply device to be coupled with, the power supply device having a primary circuit that includes the coil and a capacitance connected in series, and a capacitance that is connected in series with the coil of the secondary circuit, wherein a circuit constant of the secondary circuit is set so that the primary circuit and the secondary circuit resonate at the same frequency and a product of the square of the coupling constant, a Q value of the primary circuit and a Q value of the secondary circuit is one, and the secondary circuit receives power that is transferred from the primary circuit by means of the transformer using a carrier wave having the resonance frequency.

12. A power supply device comprising:

a primary circuit including a coil that forms a first transformer having a coupling constant of less than one with a coil of a secondary circuit of a power receiving device to be coupled with, the power receiving device having a secondary circuit and a tertiary circuit that each include a coil and a capacitance connected in series and that are coupled via a second transformer, and a capacitance that is connected in series with the coil of the primary circuit, wherein a circuit constant of the primary circuit is set so that the primary circuit, the secondary circuit and the tertiary circuit resonate at the same frequency and a product of the square of the coupling constant of the first transformer, an inductance and a resistance of the primary circuit is equal to a product of the square of the coupling constant of the second transformer, an inductance and a resistance of the tertiary circuit, and the primary circuit transfers power to the tertiary circuit via the secondary circuit by means of the first transformer and the second transformer, using a carrier wave having the resonance frequency.

13. A power receiving device comprising:

a secondary circuit including a first coil that forms a first transformer having a coupling constant of less than one with a coil of a power supply device to be coupled with, the power supply device having a primary circuit that includes the coil and a capacitance connected in series, and a capacitance that is connected in series with the first coil; and a tertiary circuit including a third coil that forms a second transformer with a second coil of the secondary circuit to be coupled with, the second coil being connected in series with the first coil, and a capacitance that Is connected in series with the third coil, wherein circuit constants of the secondary circuit and the tertiary circuit are set so that the primary circuit, the secondary circuit and the tertiary circuit resonate at the same frequency and a product of the square of the coupling constant of the first transformer, an inductance and a resistance of the primary circuit is equal to a product of the square of a coupling constant of the second transformer, an inductance and a resistance of the tertiary circuit, and the tertiary circuit receives power that is transferred from the primary circuit via the secondary circuit by means of the second transformer using a carrier wave having the resonance frequency.

* * * * *